(12) United States Patent
Mitsuhashi et al.

(10) Patent No.: US 11,157,124 B2
(45) Date of Patent: Oct. 26, 2021

(54) TOUCH PANEL DEVICE

(71) Applicant: Futaba Corporation, Mobara (JP)

(72) Inventors: Tsubasa Mitsuhashi, Mobara (JP);
Toshimitsu Fuyuki, Mobara (JP);
Yuichi Tabata, Mobara (JP); Yuhi Taguchi, Mobara (JP)

(73) Assignee: Futaba Corporation, Mobara (JP)

( * ) Notice: Subject to any disclaimer, the term of this patent is extended or adjusted under 35 U.S.C. 154(b) by 0 days.

(21) Appl. No.: 16/984,869

(22) Filed: Aug. 4, 2020

(65) Prior Publication Data

US 2021/0041989 A1 Feb. 11, 2021

(30) Foreign Application Priority Data

Aug. 6, 2019 (JP) .............................. JP2019-144524

(51) Int. Cl.
*G06F 3/044* (2006.01)
*G06F 3/047* (2006.01)

(52) U.S. Cl.
CPC ............ *G06F 3/0446* (2019.05); *G06F 3/047* (2013.01); *G06F 3/0445* (2019.05)

(58) Field of Classification Search
CPC ...... G06F 3/0446; G06F 3/0445; G06F 3/047; G06F 3/04166; G06F 3/0443; G06F 3/0414; G06F 3/044
See application file for complete search history.

(56) References Cited

U.S. PATENT DOCUMENTS

| 2007/0247443 | A1* | 10/2007 | Philipp ................... G06F 3/044 345/173 |
| 2010/0253646 | A1 | 10/2010 | Hiratsuka |
| 2014/0333575 | A1 | 11/2014 | Hu |
| 2015/0160762 | A1* | 6/2015 | Hu ........................ G06F 3/0445 345/174 |

FOREIGN PATENT DOCUMENTS

| CN | 107300998 A | 10/2017 |
| CN | 206757571 U | 12/2017 |
| JP | 2010182277 A | 8/2010 |
| JP | 2014219961 A | 11/2014 |

* cited by examiner

*Primary Examiner* — Md Saiful A Siddiqui
(74) *Attorney, Agent, or Firm* — Quarles & Brady LLP

(57) ABSTRACT

A touch panel device includes: a plurality of detection regions arranged in a matrix form; and a transmission wiring element and a receiving wiring element formed for each detection region, wherein a transmission wiring arrangement region with the transmission wiring element, the plurality of detection regions, and a receiving wiring arrangement region with the receiving wiring element are formed being aligned in one direction, wherein a value calculated from a formula as follows is smaller than a target value for a coordinate position precision: AW+2*BW−TC, wherein BW is an interval width from one of the detection regions to a next of the detection regions via the receiving wiring arrangement region and the transmission wiring arrangement region in the one direction, AW is a width for the detection regions in the one direction, and TC is a touch diameter.

6 Claims, 23 Drawing Sheets

FIG. 4
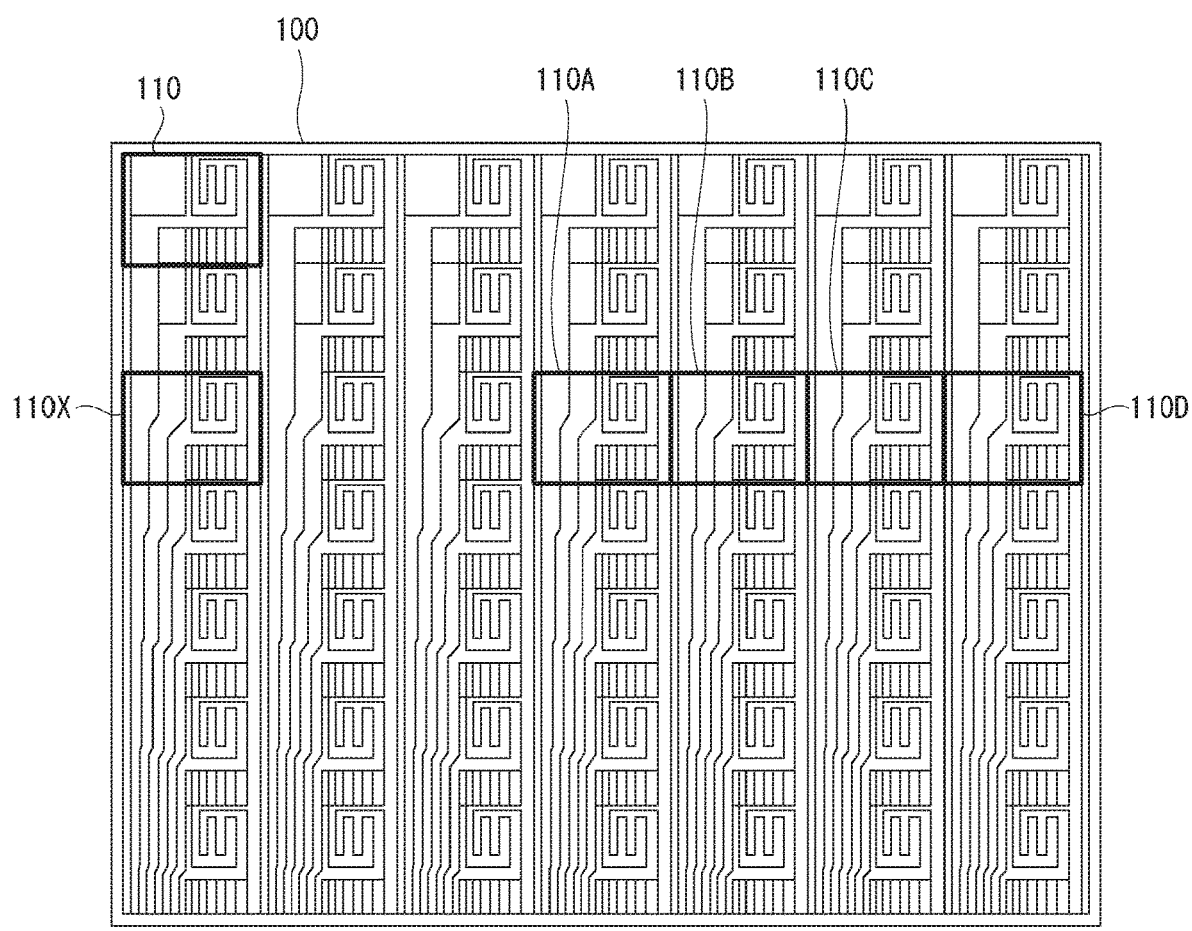
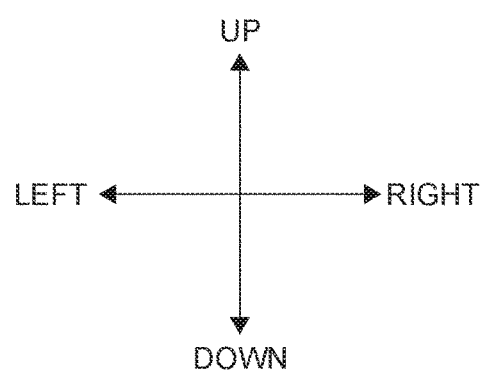

TOUCH PANEL DEVICE

CROSS-REFERENCE TO RELATED APPLICATION

This application claims the priority benefit of Japanese Patent Application No. 2019-144524 filed Aug. 6, 2019, which is fully incorporated herein by reference.

BACKGROUND OF THE INVENTION

Technical Field

The present invention relates to a touch panel device, more particularly to a technology for a touch panel structure.

Background Art

There are a variety of known technologies related to a touch panel. Patent Document 1 mentioned below discloses a sensing technology which increases a resolution by simultaneously sensing two sets (a pair of transmission signal lines and a pair of receiving signal lines) of signal lines (electrodes) and thereby detecting a touch operation position where a touch operation has been performed. Further, Patent Document 2 mentioned below discloses a so-called single layer electrode structure in which there is no intersection point of electrodes in electrode wiring in an X- and a Y-direction.

CITATION LIST

Patent Literature

Patent Document 1: JP 2014-219961 A
Patent Document 2: JP 2010-182277 A

SUMMARY OF THE INVENTION

For the touch panel, it is important to maintain or increase a precision for detecting the touch operation position. For a capacitive touch panel, a plurality of sensor cells is patterned on a substrate, wherein a position where a touch operation has been performed is detected by scanning in which a change and/or a difference in a signal voltage from the signal line is detected which corresponds a capacitance change of a sensor cell caused by the touch operation. During the detection, a structure of the sensor cells may affect a precision for detecting the change and/or the difference in the signal voltage from the signal line which corresponds the capacitance change, which may vary the precision for detecting the touch operation position in the touch panel.

Therefore, an objective of the present invention is to maintain or increase a precision for detecting touch operation positions in a touch panel by achieving a sophisticated design of a sensor cell structure.

A touch panel device according to the present invention includes: a plurality of detection regions arranged in a matrix form; and a transmission wiring element and a receiving wiring element formed for each of the plurality of detection regions, wherein a transmission wiring arrangement region with the transmission wiring element arranged therein, the plurality of detection regions, and a receiving wiring arrangement region with the receiving wiring element arranged therein are formed being aligned in one direction, wherein a value calculated from a formula as follows is smaller than a target value for a coordinate position precision:

$$AW+2*BW-TC,$$

wherein BW is an interval width from one of the detection regions to a next of the detection regions via the receiving wiring arrangement region and the transmission wiring arrangement region in the one direction, AW is a width for the detection regions in the one direction, and TC is a touch diameter.

In this manner, the width for a detection region in one direction as well as the interval width from the detection region to a next detection region via the receiving wiring arrangement region and the transmission wiring arrangement region in the one direction are determined in order to allow the detection regions in sensor cells in a sensor cell group to be more easily affected by a sensor cell in a periphery for detection of a touch operation position. As used herein, the term "touch diameter" refers to an amount which is assumed as a width of a contact surface in a left-right direction with a touch panel when the touch panel is operated via touch by a conductive object such as a finger.

For a touch panel device according to the present invention as described above, it is conceivable that TC>AW+2*BW is fulfilled.

In this manner, the width for a detection region in one direction and the interval width from the detection region to a next detection region via the receiving wiring arrangement region and the transmission wiring arrangement region in the one direction are formed so that the touch diameter TC extends over multiple detection regions.

For a touch panel device according to the present invention as described above, it is conceivable that AW>BW is fulfilled.

With a larger size for the detection regions, detection regions of the sensor cells in the sensor cell group may be allowed to be more easily affected by a detection region of a sensor cell in the periphery when detection of a touch operation position is performed.

Further, a touch panel device according to the present invention includes: a plurality of detection regions arranged in a matrix form; and a transmission wiring element and a receiving wiring element formed for each of the plurality of detection regions, wherein a transmission wiring arrangement region with the transmission wiring element arranged therein, the plurality of detection regions, and a receiving wiring arrangement region with the receiving wiring element arranged therein are formed being aligned in one direction, wherein a value calculated from a formula as follows is smaller than a target value for a coordinate position precision:

$$AW+BW-TC/2,$$

wherein BW is an interval width from one of the detection regions at an end in the one direction to an adjacent one of the detection regions via the receiving wiring arrangement region and the transmission wiring arrangement region, AW is a width for the one of the detection regions at the end in the one direction, and TC is a touch diameter.

In this manner, the width for the detection region at the end in the one direction as well as the interval width from the detection region at the end to the adjacent detection region via the receiving wiring arrangement region and the transmission wiring arrangement region are determined in order to allow the detection region at the end to be more easily affected by a detection region of a sensor cell in the periphery when detection of a touch operation position is performed.

"TC/2" represents dividing a value for the touch diameter TC in half.

In a touch panel device according to the present invention as described above, the width for the detection region at the end in the one direction is narrower than the width of the adjacent detection region in the one direction.

This may cause that detection regions of the sensor cells in the sensor cell group can be more easily affected by a detection region of a sensor cell in the periphery when detection of a touch operation position at the end of the touch panel is performed.

Furthermore, a touch panel device according to the present invention includes: a plurality of detection regions arranged in a matrix form; and a transmission wiring element and a receiving wiring element formed for each of the plurality of detection regions, wherein a transmission wiring arrangement region with the transmission wiring element arranged therein, the plurality of detection regions, and a receiving wiring arrangement region with the receiving wiring element arranged therein are formed being aligned in one direction, and wherein at least some of the plurality of detection regions are arranged in a series from a central section to an end of the touch panel device in the one direction and configured so that areas of detection regions of the at least some of the plurality of detection regions are decreased at a substantially constate rate along the one direction.

In this manner, a capacitance change due to an area difference between adjacent detection regions may be reduced.

With the present invention, the precision for detecting the touch operation position in the touch panel can be maintained or increased.

BRIEF DESCRIPTION OF THE DRAWINGS

FIG. 4. is an illustration view of a single layer electrode structure according to an embodiment;

DETAILED DESCRIPTION OF THE PREFERRED EMBODIMENTS

Hereinafter, embodiments will be described in the following sequence. It is to be noted that for a feature which has been described once, the same reference sign shall be used for the feature thereafter and description thereof shall be omitted.

<1. Configuration for a touch panel device>
<2. Sensing operation>
<3. Electrode arrangement structure for a touch panel>
<4. First embodiment>
<5. Second embodiment>
<6. Third embodiment>
<7. Conclusion and exemplar variations>

1. Configuration for a Touch Panel Device

Figure 1:
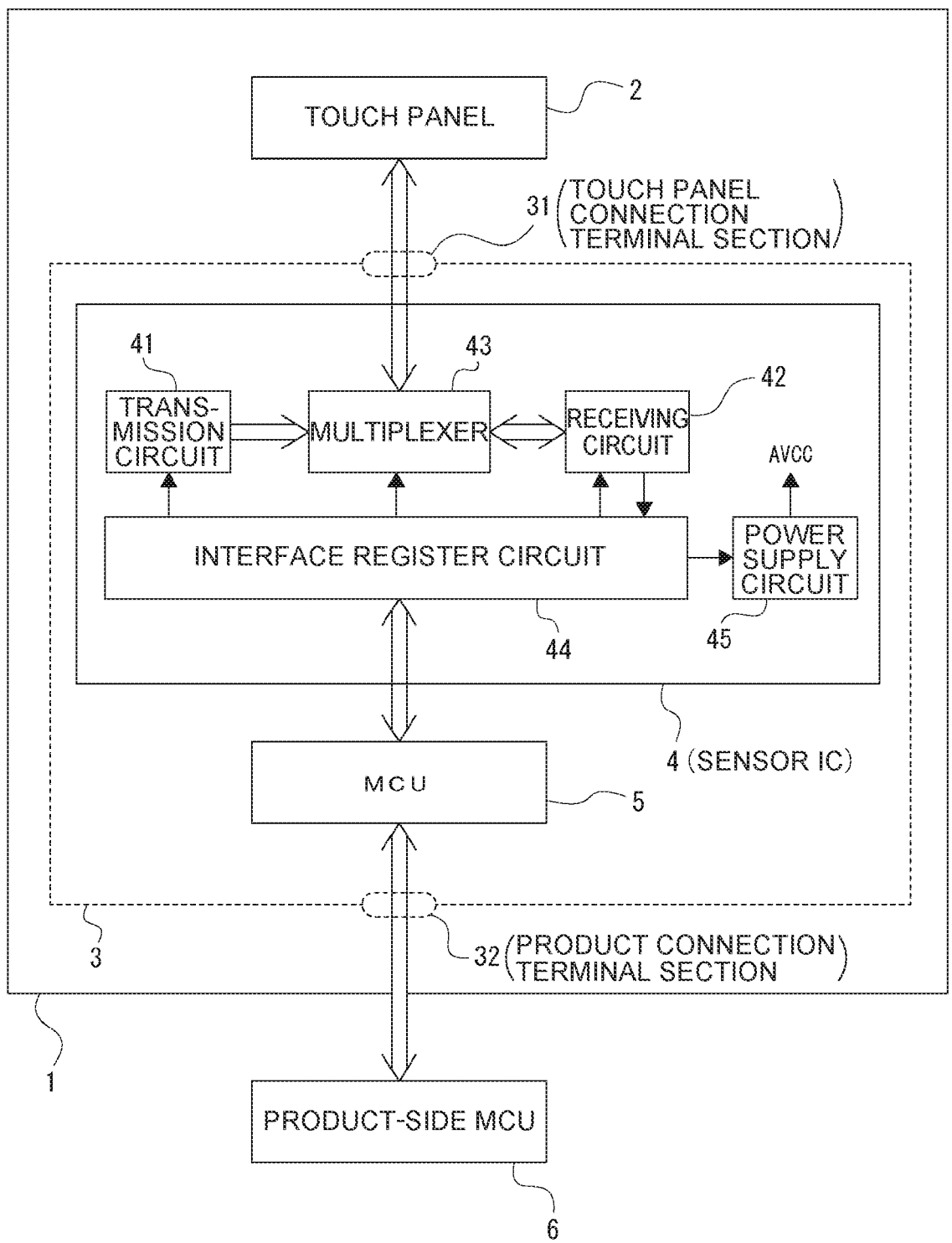
FIG. 1. is a block diagram of a touch panel device according to an embodiment of the present invention.

FIG. 1 shows an exemplar configuration for a touch panel device 1 according to an embodiment. The touch panel device 1 is configured to be mounted as a user interface device to various apparatus. The various apparatus may include e.g. an electronic apparatus, a telecommunication apparatus, an information processing device, an apparatus for a manufacture plant, a machining tool, a vehicle, an airplane, an apparatus for building facilities, and other apparatus from a wide variety of fields. The touch panel device 1 may be employed as an operation and input device to be used for user operation and input in the above-mentioned variety of apparatus products. FIG. 1 shows the touch panel device 1 and a product-side MCU (Micro Control Unit) 6, wherein the product-side MCU 6 represents a control unit included in an apparatus to which the touch panel device 1 is to be mounted. In this case, the touch panel device 1 performs an operation for providing information about a touch panel operation of a user to the product-side MCU 6.

The touch panel device 1 includes a touch panel 2 and a touch panel drive unit 3. The touch panel drive unit 3 includes a sensor IC (Integrated Circuit) 4 and an MCU 5. The touch panel drive unit 3 is connected to the touch panel 2 via a touch panel connection terminal section 31. Through the connection, the touch panel drive unit 3 performs driving (sensing) operation of the touch panel 2. When being mounted as an operation and input device to an apparatus, the touch panel drive unit 3 is connected to the product-side MCU 6 via a product connection terminal section 32.

Through the connection, the touch panel drive unit 3 transmits a sensed operation information to the product-side MCU 6.

The sensor IC 4 in the touch panel drive unit 3 includes a transmission circuit 41, a receiving circuit 42, a multiplexer 43, an interface register circuit 44, and a power supply circuit 45.

Figure 2:
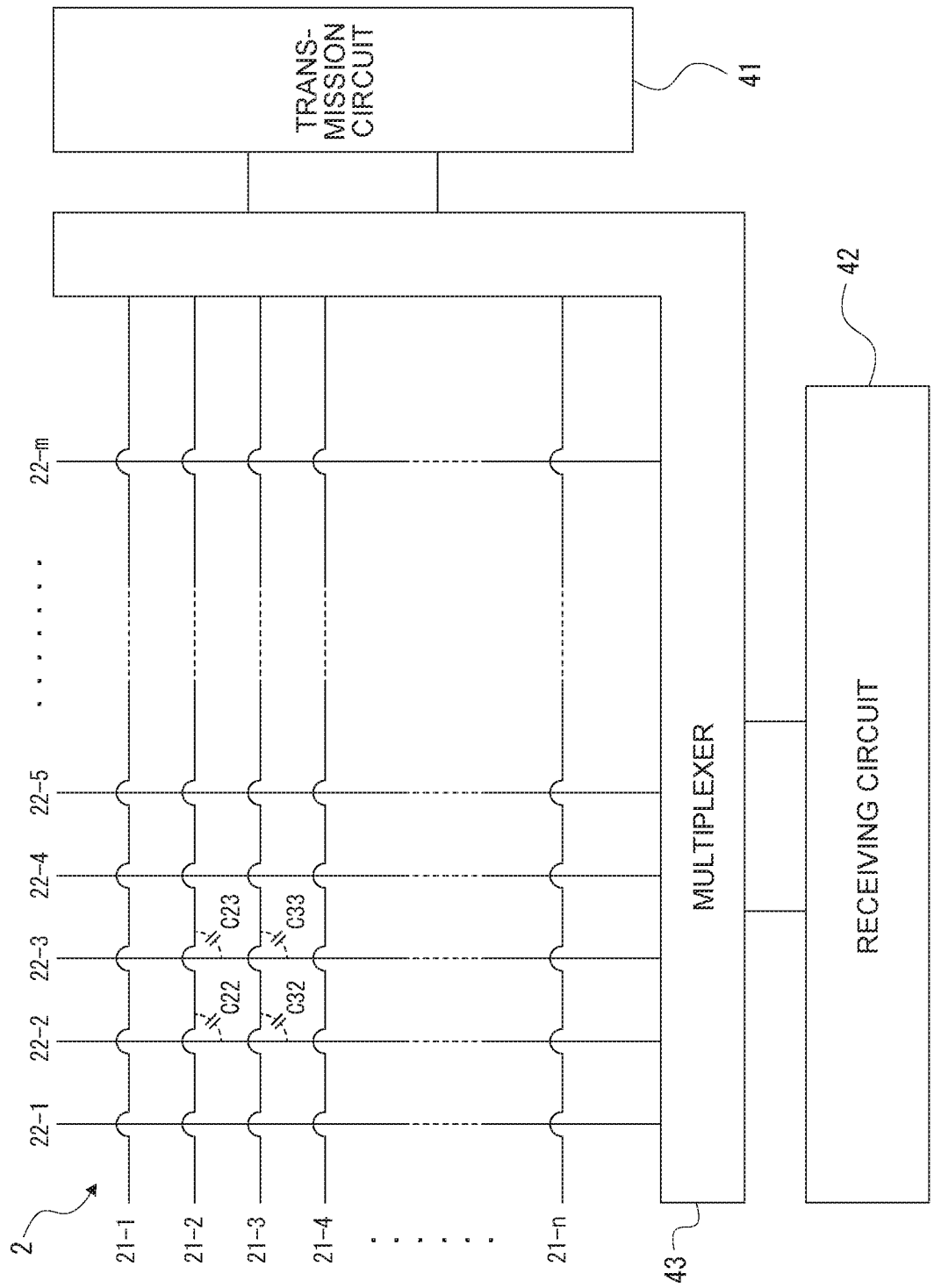
FIG. 2. is an illustration view of a signal line structure for a touch panel according to an embodiment.

The transmission circuit 41 of the sensor IC 4 outputs a transmission signal to a terminal of the touch panel 2 which was selected by the multiplexer 43. The receiving circuit 42 receives the signal from the terminal of the touch panel 2 which was selected by the multiplexer 43, and performs a necessary comparison process etc. FIG. 2 schematically shows how the transmission circuit 41, the receiving circuit 42 and the multiplexer 43 are connected to the touch panel 2. For the touch panel 2, n transmission signal lines 21-1 to 21-n as electrodes at a transmission side are arranged on a panel plane which forms a touch surface. Similarly, m receiving signal lines 22-1 to 22-m as electrodes at a receiving side are arranged on the panel plane. Where it is not particularly distinguished between the individual transmission signal lines 21-1 . . . 21-n and/or between the individual receiving signal lines 22-1 . . . 22-m, they shall be referred to collectively as "transmission signal lines 21" and "receiving signal lines 22", respectively.

In some cases, the transmission signal lines 21-1 . . . 21-n and the receiving signal lines 22-1 . . . 22-m are arranged intersecting each other as shown, while in some other cases, the both signal lines are arranged in a so-called single layer electrode structure without intersecting each other as described in the embodiments below. In both cases, it is configured so that the touch operation surface is formed within a region where the transmission signal lines 21 and the receiving signal lines 22 are arranged, wherein a structure is obtained in which an operation position is detected via a capacitance change when a touch operation is performed. Although the figure shows only a part of capacities (capacities C22, C23, C32, C33) generated between the transmission signal lines 21 and the receiving signal lines 22 as an example, capacities are generated between the transmission signal lines 21 and the receiving signal lines 22 across the entire touch operation surface (e.g. capacities at intersection points), wherein the receiving circuit 42 detects a position where a capacitance change is caused by a touch operation.

The transmission circuit 41 outputs the transmission signal to a transmission signal line 21-1 . . . 21-n which has been selected by the multiplexer 43. The present embodiment provides scanning in which two adjacent transmission signal lines 21 are selected by the multiplexer 43 at each time. The receiving circuit 42 receives a received signal from a receiving signal line 22-1 . . . 22-m which has been selected by the multiplexer 43. In the present embodiment, the multiplexer 43 selects two adjacent receiving signal lines 22 at each time. Sensing operations by the transmission circuit 41 and the receiving circuit 42 will be described later.

Referring back to FIG. 1, various configuration informations for the transmission circuit 41, the receiving circuit 42, the multiplexer 43 and the power supply circuit 45 are written into the interface register circuit 44 of the sensor IC 4 by the MCU 5. Operations of the transmission circuit 41, the multiplexer 43, the receiving circuit 42 and the power supply circuit 45 are controlled with the respective configuration informations stored in the interface register circuit 44. Further, the interface register circuit 44 is configured so that it is capable of storing a detected value (it is also referred to as a "RAW value" for explanation purposes) therein and allowing it available to the MCU 5, the detected value having been detected by the receiving circuit 42.

The power supply circuit 45 is configured to generate and apply a driving voltage AVCC to the transmission circuit 41 and the receiving circuit 42. As described later, the transmission circuit 41 applies a pulse with the driving voltage AVCC to one or more transmission signal lines 21 which has been selected by the multiplexer 43. For the sensing operation, the receiving circuit 42 applies the driving voltage AVCC to one or more receiving signal lines 22 which has been selected by the multiplexer 43. Configuration of the power supply circuit 45 will be described later.

The MCU 5 performs configuration and control of the sensor IC 4. More specifically, the MCU 5 writes necessary configuration information into the interface register circuit 44 to control various sections of the sensor IC 4. Further, the MCU 5 acquires the RAW value obtained from the receiving circuit 42 via reading it out of the interface register circuit 44. Then, the MCU 5 performs a coordinate calculation using the RAW value and transmits a coordinate value as information about a touch operation position of the user to the product-side MCU 6.

2. Sensing Operation

Figure 3:
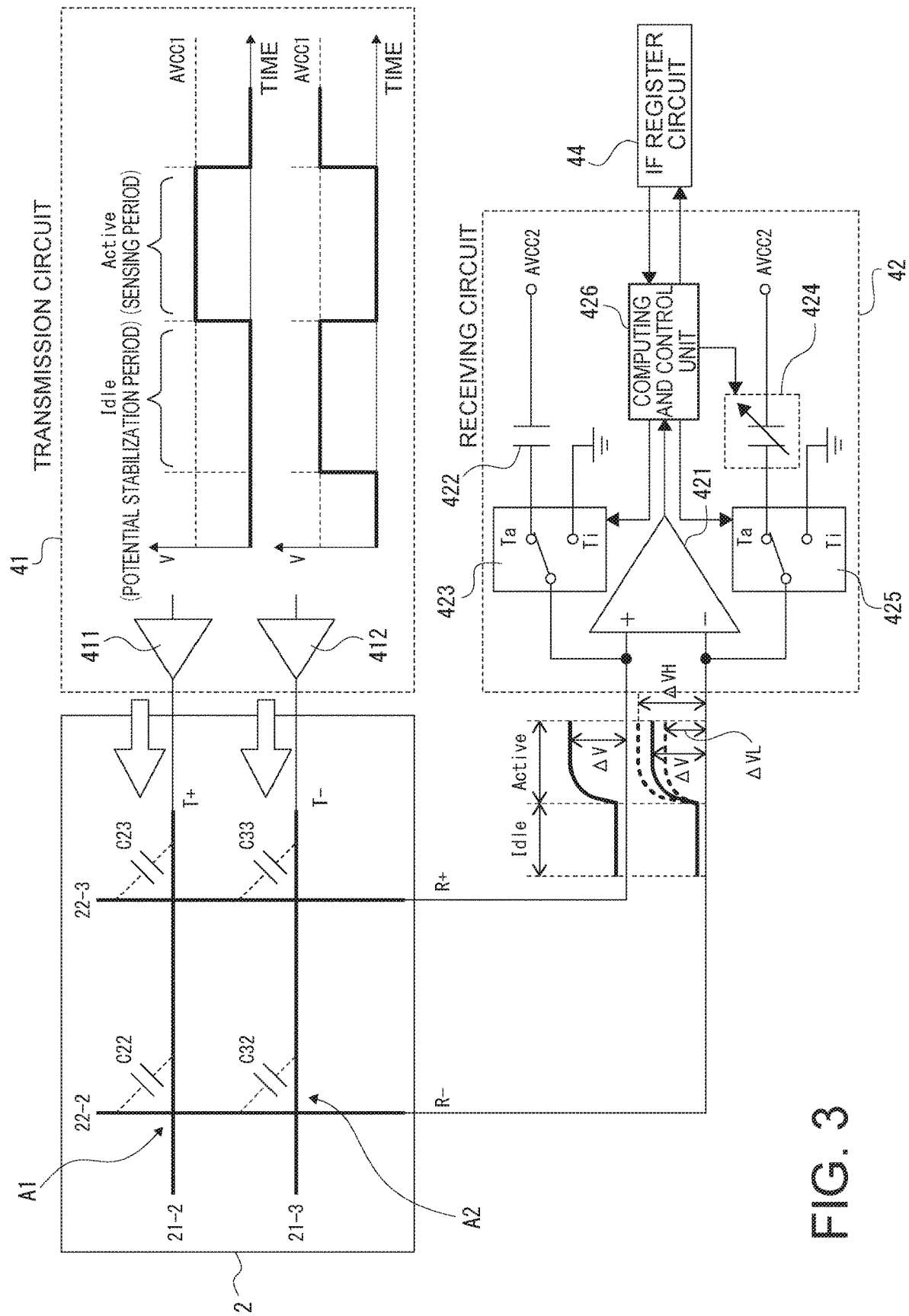
FIG. 3. is an illustration view of a sensing operation according to an embodiment.

Sensing operation by the touch panel device 1 as described above will be explained. First, operations of the transmission circuit 41 and the receiving circuit 42 related to the touch panel 2 will be described with reference to FIG. 3. In the figure, two transmission signal lines 21-2, 21-3 and two receiving signal lines 22-2, 22-3 are shown in the touch panel 2. The present embodiment is provided so that the detection of the touch operation is accomplished by the transmission circuit 41 and the receiving circuit 42 which perform transmission to or receiving from two adjacent transmission signal lines 21 and/or two adjacent receiving signal lines 22 as shown in the above FIG. 2 at each time, respectively. This means that a pair of transmission signal lines 21 and a pair of receiving signal lines 22, i.e. two by two signal lines form a basic cell, wherein scanning is performed for detection for each of such basic cells successively. Thus, FIG. 3 shows one of such cells partially.

The transmission circuit 41 is configured to output driving voltages AVCC1 from drivers 411 and 412 to two transmission signal lines 21 (in the shown case, transmission lines 21-2 and 21-3). This means that transmission signals T+ and T− as outputs of the drivers 411 and 412 are provided to the transmission signal lines 21-2 and 21-3 which have been selected by the multiplexer 43. The driving voltages AVCC1 are a driving voltage AVCC generated by the power supply circuit 45 itself according to FIG. 1, or a voltage based on the driving voltage AVCC. In this case, for the transmission signal T+ from the driver 411 in the transmission circuit 41, a low level (hereinafter referred to as an "L-level") is set in an idling period as shown. E.g. 0 volt is set. A high level (hereinafter referred to as an "H-level") is set in a following active period. In this case, specifically, the driving voltage AVCC1 is applied as a signal at the H-level. Further, for the transmission signal T− from the other driver 412 in the transmission circuit 41, an H-level is set (the driving voltage AVCC1 is applied) in the idling period, wherein an L-level is set in the following active period. Here, in the idling period, potentials of the received signals R+ and R− are stabilized, wherein in the active period, potential changes in the received signals R+ and R− are sensed.

In the idling period and the active period, the receiving circuit 42 receives the received signals R+ and − from the two receiving signal lines 22 (in the shown case, receiving signal lines 22-3 and 22-2) which have been selected by the multiplexer 43. The receiving circuit 42 includes a comparator 421, a reference capacitance unit 422, switches 423 and 425, a measurement capacitance unit 424, and a computing and control unit 426. The received signals R+ and R− from the two receiving signal lines 22 are received by the comparator 421. The comparator 421 compares potentials of the received signals R+ and R−, and then outputs the comparison result at an H- or L-level to the computing and control unit 426.

A driving voltage AVCC2 is applied to one end of a capacitor which forms the reference capacitance unit 422. The driving voltage AVCC2 is the driving voltage AVCC generated by the power supply circuit 45 according to FIG. 1 itself, or a voltage based on the driving voltage AVCC. Another end of the capacitor which forms the reference capacitance unit 422 is connected to a positive input terminal of the comparator 421 via a terminal Ta of the switch 423. The driving voltage AVCC2 is applied to one end of the measurement capacitance unit 424. Another end of the measurement capacitance unit 424 is connected to a negative input terminal of the comparator 421 via a terminal Ta of the switch 425.

For the switches 423 and 425, terminals Ti are selected in the idling period. Accordingly, in the idling period the positive input terminal (the receiving signal line 22-3) and the negative input terminal (receiving signal line 22-2) of the comparator 421 are grounded so that the received signals R+ and R− are at a ground potential. In the active period, the terminals Ta of the switches 423 and 425 are selected. Accordingly, in the active period, the driving voltage AVCC2 is applied to the positive input terminal (the receiving signal line 22-3) and the negative input terminal (receiving signal line 22-2) of the comparator 421.

FIG. 3 indicates waveforms of the received signals R+ and R− in an untouched state of the cell with solid lines. In the idling period, the received signals R+ and R− are stabilized at a potential (ground potential) by selecting the terminals Ti of the switches 423 and 425. In the active period, the driving voltage AVCC2 is applied to the receiving signal lines 22-3 and 22-2 by selecting the terminals Ta of the switches 423 and 425. Accordingly, the potentials of the received signals R+ and R− are increased by ΔV. In the untouched state, the potential increase by ΔV occurs in both of the received signals R+ and R−. On the other hand, on the side of the transmission circuit 41, the transmission signal T+ rises up in the active period, while the transmission signal T− falls down. In this manner, when a touch operation has been performed, it varies for the received signals R+ and R− how much the potentials of the received signals increase. Assuming that a position A1 is touched which is configured to affect a capacitance C22, the potential of the received signals R− is increased by ΔVH in the active period as indicated with a dashed line. Further, assuming that a position A2 is touched which is configured to affect a capacitance C32, the potential of the received signals R− is increased by ΔVL in the active period as indicated with a dashed line. As shown in these examples, an amount of the potential change of the received signal R− may be larger or smaller than an amount of the potential change (ΔV) of the received signal R+ depending on the touch operation position within the cell. The comparator 421 compares such received signals R+ and R−.

Although it is possible to output as the RAW values (detection results) the potential differences of the received signals R+ and R− themselves which are changed as described above, according to the present embodiment, the receiving circuit 42 is configured so that the computing and control unit 426 is capable of modifying a configuration of the measurement capacitance unit 424 to balance voltages of the received signals R+ and R− in order to obtain the RAW values. The computing and control unit 426 switches the switches 423 and 425 on/off and switches a capacitance value of the measurement capacitance unit 424 according to the configuration information which is written into the interface register circuit 44. The computing and control unit 426 is further configured to monitor the output of the comparator 421 and to calculate the RAW value in a process as described below. The RAW value calculated in the computing and control unit 426 will be available to the MCU 5 by writing the RAW value into the interface register circuit 44.

3. Electrode Arangement Structure for a Touch Panel

An electrode arrangement structure for the touch panel 2 will be described with reference to FIG. 4. Here, a single layer electrode structure is employed for the electrode arrangement structure for the touch panel 2. FIG. 4 shows a schematic view of the electrode arrangement structure for the touch panel 2. The following description shall be based on directions shown in FIG. 4 as an up-down and a left-right direction. This is applied to FIGS. 5 to 23 similarly.

As shown in FIG. 4, the touch panel 2 includes a plurality of sensor cells 110 arranged on a substrate 100, wherein a sensor pattern is formed in a matrix form. For a reason of graphical illustrating, FIG. 4 shows an example where a sensor pattern with sensor cells 110 in seven columns in the left-right direction and in seven rows in the up-down direction is formed on the substrate 100.

The touch operation surface is formed within a region of the sensor pattern formed on the substrate 100, wherein the operation position can be detected via a capacitance change of each of the sensor cells 110 upon a touch operation. The sensor cells 110 correspond to portions of intersection between the transmission signal lines 21 and the receiving signal lines 22 shown in FIG. 2.

While for a reason of explanation, the description of the present embodiment is based on the arrangement of the sensor cells 110 which has a matrix with seven columns in the left-right direction and seven rows in the up-down direction, the arrangement of the sensor cells 110 may be designed in various manners depending on a shape and/or a size for the touch operation surface of the touch panel 2.

4. First Embodiment

A first embodiment for the structure of the touch panel 2 will be described with reference to FIGS. 5 to 8. According to the first embodiment, a sensor cell 110X is used as an example for the sensor cell 110. In the following description, the sensor cells shall be generally referred to as "sensor cell 110" where it is not particularly distinguished between the sensor cells.

Figure 5:
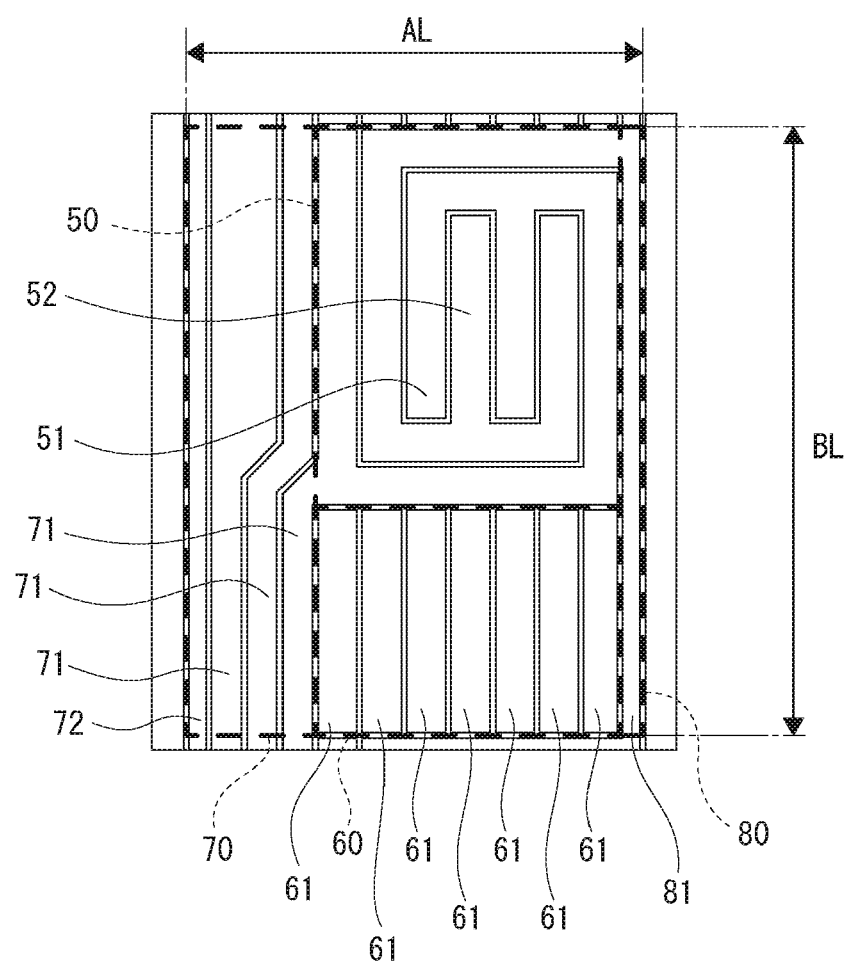
FIG. 5. is an illustration view of a sensor cell structure according to an embodiment.

FIG. 5 shows a plan view of the structure of sensor cell 110X. According to the present embodiment, if a width of the sensor cell 110X in the left-right direction is a lateral width AL while a width of the sensor cell 110X in the up-down direction is a vertical width BL, the sensor cell 110X is configured so that a value for the lateral width AL is smaller than a value for the vertical width BL. For example, according to FIG. 5, the sensor cell 110X is configured with the lateral width AL of 6 mm and the vertical width BL of 8 mm (AL=6 mm and BL=8 mm).

The sensor cell 110X includes a detection region 50, a dummy electrode arrangement region 60, a transmission wiring arrangement region 70, and a receiving wiring arrangement region 80. The regions are formed in a non-contact state with each other. For better understanding, intervals between the shown regions are larger than the actual intervals.

The detection region 50 is formed in a rectangular shape in the plan view, and formed with a pair of a transmission electrode 51 and a receiving electrode 52. The transmission electrode 51 and the receiving electrode 52 are formed in a comb form, and arranged so as to be interdigitated with each other. At this time, the transmission electrode 51 and the receiving electrode 52 are configured in a non-contact state. In this manner, the transmission electrode 51 and the receiving electrode 52 are coupled capacitively with a predetermined capacitance with each other by arranging the transmission electrode 51 and the receiving electrode 52 on the same plane.

A position coordinate for a touch operation position within the sensor cell 110X can be determined through coordinate calculation based on a centroid value which is calculated with the RAW value, wherein the RAW value is detected not only using the detection region 50 in the sensor cell 110X, but also using a detection region 50 in a sensor cell 110 around the sensor cell 110X together. In this manner, it is possible to detect a position coordinate of the touch operation position with a resolution equal to or higher than a density of the detection regions 50 arranged in a matrix form on the substrate 100.

The dummy electrode arrangement region 60 is located below the detection region 50, wherein a plurality of dummy electrodes 61 is arranged in parallel in the left-right direction in a non-contact state with each other. The dummy electrodes 61 are arranged for taking account of an optical appearance, not electrically connected to a voltage source such as a driving circuit, and provided in a floating state.

The transmission wiring arrangement region 70 is located on the left side of the detection region 50 and the dummy electrode arrangement region 60, wherein a plurality of transmission wiring elements 71 and a ground electrode 72 are arranged in the transmission wiring arrangement region 70. Although the transmission wiring elements 71 are formed with the same material as the transmission electrode 51, they are distinguished in this description for a reason of explanation. The transmission wiring elements 71 form the transmission signal lines 21 as shown in FIG. 2.

The transmission wiring elements 71 are connected to the detection regions 50 by connecting the transmission wiring elements 71 to transmission electrodes 51, and extend downward starting from portions connected to the detection regions 50. In the transmission wiring arrangement region 70 the transmission wiring element 71 connected to the detection region 50 and one or more further transmission wiring elements 71 are arranged in parallel in the left-right direction in a non-contact state with each other, the one or more further transmission wiring elements 71 being provided for one or more further detection regions 50 which are arranged in a series above the detection region 50 and adjacent to the detection region 50 in series. Further, the ground electrode 72 is arranged adjacent to a left end of the transmission wiring elements 71 in a non-contact state with the transmission wiring elements 71.

With regard to the plurality of transmission wiring elements 71 which is pulled out of the detection regions 50 in each column within the sensor pattern on the substrate 100 and extends downward, transmission wiring elements 71 associated with sensor cells 110 of each row within the sensor pattern are interconnected, wherein the transmission wiring elements 71 are connected to the transmission circuit 41 via the multiplexer 43 as shown in FIG. 2. The transmission circuit 41 is capable of outputting the transmission signal for sensing operation to a transmission wiring element 71 which is selected by the multiplexer 43. At this time, the remaining transmission wiring elements 71 which are not selected by the multiplexer 43 are set as ground electrodes.

The receiving wiring arrangement region 80 is located on the right side of the detection region 50 and the dummy electrode arrangement region 60, wherein the receiving wiring element 81 is arranged in the receiving wiring arrangement region 80. Although the receiving wiring element 81 is formed with the same material as the receiving electrode 52, they are distinguished in this description for a reason of explanation. The receiving wiring element 81 forms a receiving signal line 22 as shown in FIG. 2.

The receiving wiring element 81 is connected to the detection region 50 by connecting the receiving wiring element 81 to the receiving electrode 52, and extend along the up-down direction starting from a portion connected to the detection region 50. The receiving wiring element 81 is configured as a single wiring element connected to each of the detection regions 50 which are arranged in a series along the up-down direction of the columns within the sensor pattern on the substrate 100, wherein the receiving wiring element 81 is pulled out downward.

With regard to the receiving wiring element 81 which is pulled out downward, it is connected to the receiving circuit 42 via the multiplexer 43 as shown in FIG. 2. In this manner, the receiving circuit 42 can receive the received signal for sensing operation from a receiving wiring element 81 selected by the multiplexer 43. Accordingly, a position with a capacitance change e.g. due a touch operation is detected by the receiving circuit 42.

With the single layer electrode structure with the sensor cell 110X as described above, it is possible that the transmission electrode 51 and its transmission wiring element 71 are arranged together with the receiving electrode 52 and its receiving wiring element 81 on the same plane without forming a insulating layer for preventing electrically conductive connection in case of intersecting the transmission electrode 51 with the receiving electrode 52.

Figure 6:
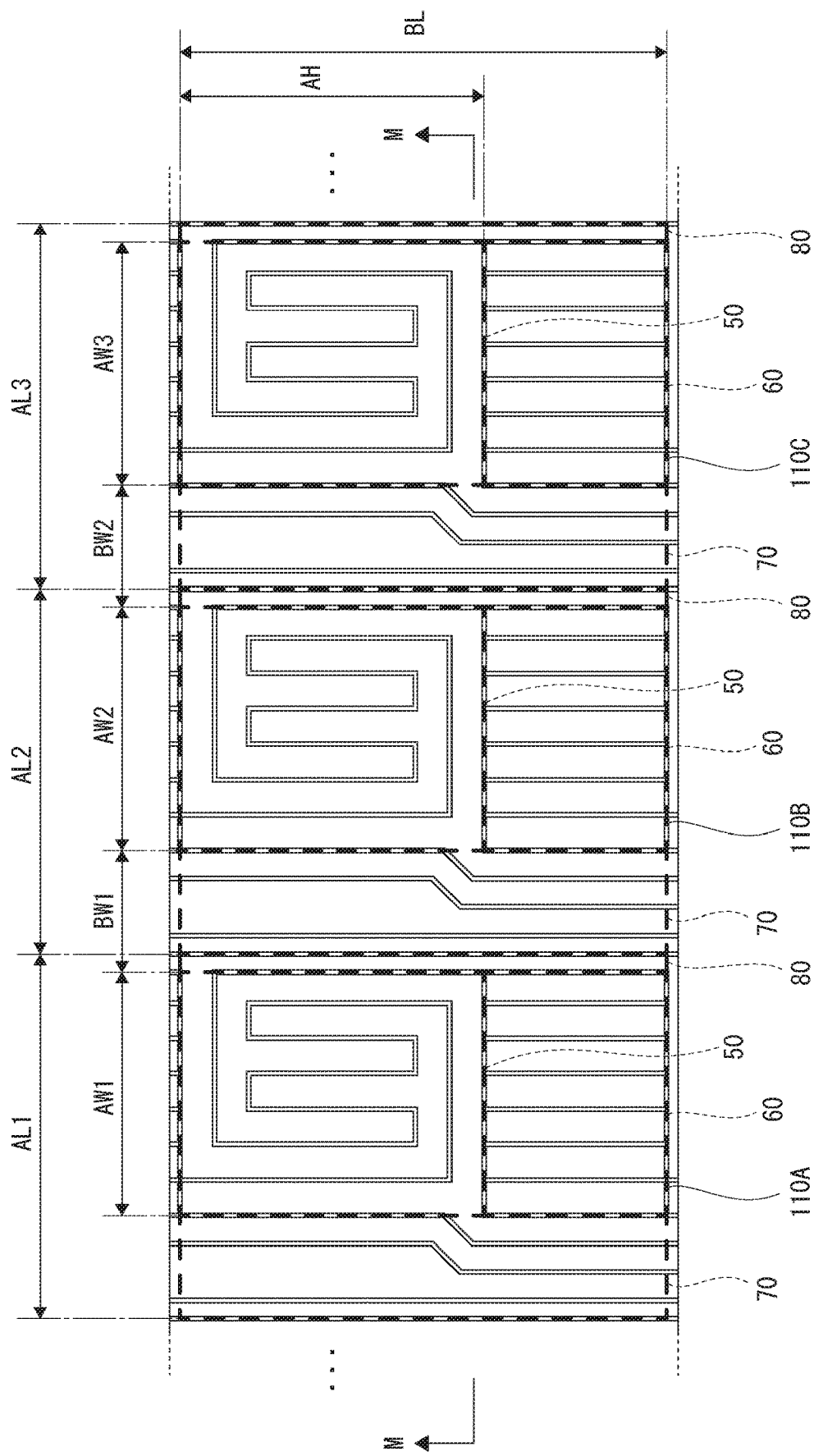
FIG. 6. is an illustration view of sensor cells arranged in a series in a left-right direction according to an embodiment.
Figure 7:
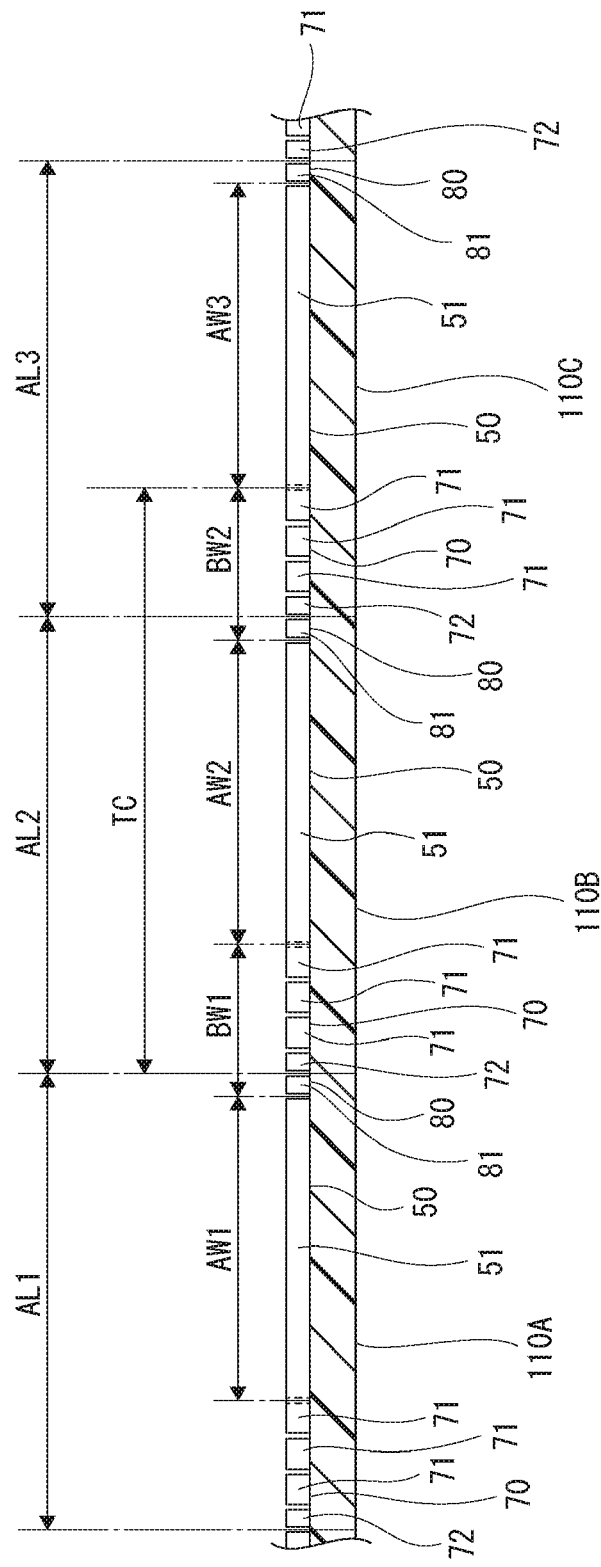
FIG. 7. is a sectional view of the embodiment of FIG. 6 along the line M-M.

FIG. 6 shows a part of sensor cells 110 arranged in a series in a left-right direction within a sensor pattern on a substrate 100. FIG. 7 shows a sectional view of FIG. 6 along a line M-M. Referring to FIGS. 6 and 7, sensor cells 110A, 110B and 110C will be described which are arranged in a series along the left-right direction shown in FIG. 4.

The sensor cells 110A, 110B and 110C are provided so that lateral widths AL1, AL2 and AL3 of the sensor cells 110A, 110B and 110C have a same length. For example, the lateral widths AL1, AL2 and AL3 have a length of 6 mm (AL1=AL2=AL3=6 mm). Further, the sensor cells 110A, 110B and 110C are configured to have a same vertical width BL, e.g. 8 mm (BL=8 mm).

FIGS. 6 and 7 show a width for the detection regions 50 of the sensor cells 110 in the left-right direction as a detection width AW. Here, the detection width AW for each of the detection regions 50 in the sensor cells 110A, 110B and 110C is shown as detection widths AW1, AW2 and AW3, wherein these detection widths AW have a same length. Here, the detection widths AW1 AW2 and AW3 are e.g. 4 mm (AW1=AW2=AW3=4 mm). Further, a width for the detection regions 50 in the up-down direction is shown as a vertical width AH, wherein the vertical widths AH for the detection regions 50 in the sensor cells 110A, 110B and 110C have a same length, e.g. 5 mm.

An interval width from a detection region 50 to a next detection region 50 via the receiving wiring arrangement region 80 and the transmission wiring arrangement region 70 in the left-right direction is shown as an interval width BW. For example, an interval width BW1 is provided between a detection region 50 in the sensor cell 110B and a detection region 50 in the sensor cell 110A. In the interval width BW1, a receiving wiring arrangement region 80 of the sensor cell 110A and a transmission wiring arrangement region 70 of the sensor cell 110B are provided. Similarly, an interval width BW2 is provided between the detection region 50 of the sensor cell 110B and a detection region 50 of the sensor cell 110C, wherein a receiving wiring arrangement region 80 and a transmission wiring arrangement region 70 are provided similarly in the interval width BW2.

A touch operation position within the sensor cell 110 can be determined through coordinate calculation based on a centroid value which is calculated with the RAW value, wherein the RAW value is detected not only using the detection region 50 in the sensor cell 110, but also using a detection region 50 in a sensor cell 110 around the sensor cell 110. For example, a coordinate for a touch operation position within the sensor cell 110B is calculated based on changes in capacitances of the detection regions 50 in the sensor cell 110B as well as the sensor cells 110A, 110C and the like which are adjacent to the sensor cell 110B, wherein the changes are generated when a touch operation surface is touched. Here, the interval widths BW1 and BW2 are provided from the detection region 50 of the sensor cell 110B to the sensor cells 110A, 110C, respectively.

Transmission electrodes 71 of the plurality of transmission wiring elements 71 in the transmission wiring arrangement regions 70 arranged in the interval widths BW1 and BW2 which are not selected by the multiplexer 43 are set as ground electrodes. At this time, due to the structure of the sensor cells 110, the interval widths BW1 and BW2 may lead to insensitivity of the detection region 50 of the sensor cell 110B to the detection regions 50 of the laterally adjacent sensor cells 110A and 110C, so that the coordinate for a touch operation position within the sensor cell 110B may be detected with less precision depending on lengths of the detection width AW and the interval width BW of the detection region 50.

Therefore, it is necessary to define the lengths of the detection width AW for each of the sensor cells 110 and the interval width BW between the sensor cells 110 in order to avoid loss in the precision for detecting the coordinate of the touch operation position within the sensor cell 110B.

Therefore, according to the first embodiment, provided that a touch diameter TC is defined as a value which is assumed as a width of a contact surface in the left-right direction with the touch panel 2 when the touch panel 2 is operated via touch by a conductive object such as a finger, the detection width AW for the sensor cell 110 and the interval width BW for a sensor cell 110 adjacent to the sensor cell 110 so as to fulfill the following formula F1. In the following description, values in each of formulas F set forth below is described in mm.

$$1 > AW + 2*BW - TC \quad \text{[Formula F1]}$$

In the above formula F1, 1 mm is a target value for the coordinate position precision, wherein it may be various numerical values depending on the target for the coordinate position precision for the sensor cell 110, e.g. 0.8, 0, −1, as long as it is below 1 mm. Since the detection widths AW1, AW2 and AW3 have a same length and the interval widths BW1 and BW2 have a same length, defining the detection width AW and the interval width BW according to the formula F1 means that the detection widths AW and the interval widths BW for the sensor cells 110 are defined. It is to be noted that for sensor cells 110 of the plurality of sensor cells 110 on the substrate 100 which are located at ends in the left-right direction, a formula different from the above one is used to define the detection width AW and the interval width BW, which will be described in a second embodiment in details.

According to the present embodiment, e.g. when the touch diameter TC is set to 8 mm (TC=8 mm), the detection width AW=4 mm and the interval width BW=2 mm so that applying these values to the formula F1 results in 1>4+2*2−8=0, which fulfills the formula F1.

Figure 8:
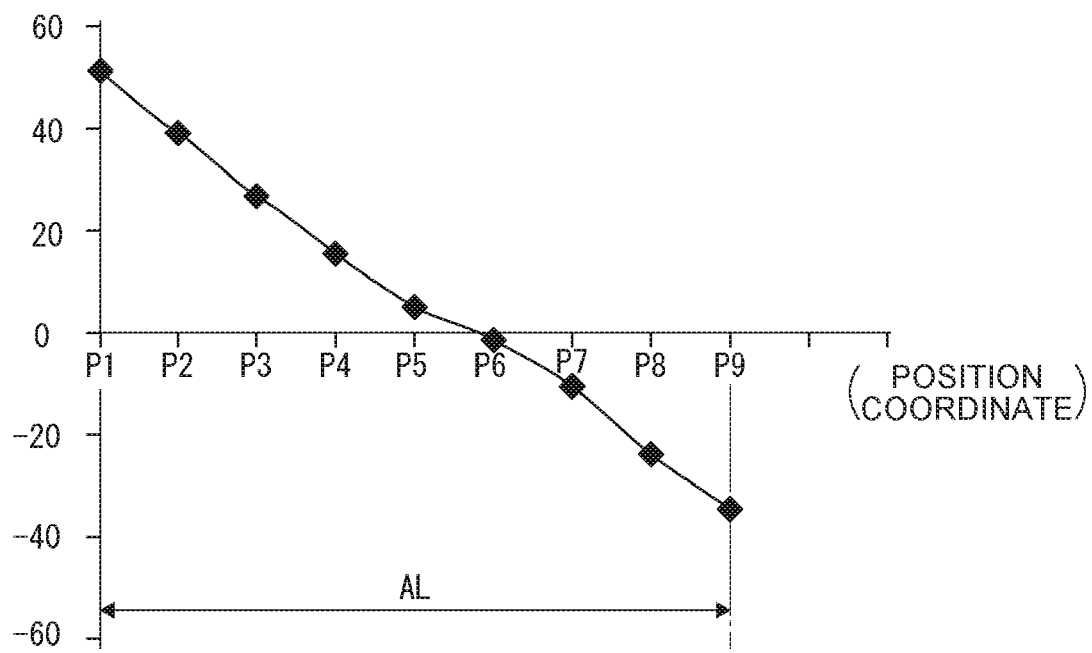
FIG. 8. is a diagram showing a relation of position coordinates to centroid values according to an embodiment.

By defining the detection width AW and the interval width BW so as to fulfill the formula F1, a graph as shown in FIG. 8 can be obtained for a relation between a position coordinate P in the left-right direction of the lateral width AL for the sensor cell 110 and the centroid value for the sensor cell 110. I.e., as shown in FIG. 8, this results in that different centroid values are associated with different position coordinates P1, P2 ... P9 which are located in a series in the left-right direction of the lateral width AL for the sensor cells 110.

Since the position coordinate within the sensor cell 110 can be obtained by back calculation from the centroid value, according to the graph shown in FIG. 8, it is possible to detect a coordinate P2 and a coordinate P6 as touch operation positions within the sensor cell 110 for a centroid values of 40 and 0, respectively, so that the coordinates along the lateral width AL within the sensor cell 110 which correspond to the centroid values can be determined in a unique manner. Thus, it is possible to calculate a change in the centroid value for each coordinate within the sensor cell 110 with a good precision and to increase the precision for detecting the touch operation position within the sensor cell 110.

Figure 9:
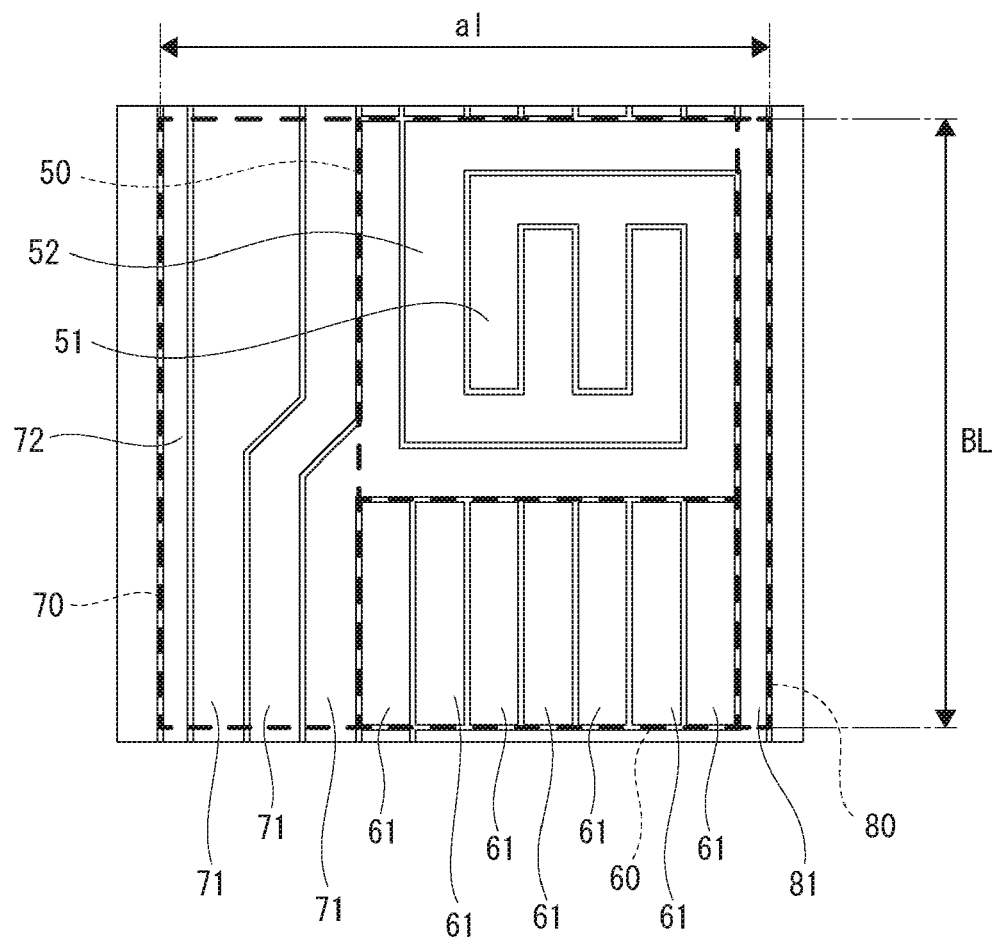
FIG. 9. is an illustration view of a sensor cell structure according to an embodiment.
Figure 10:
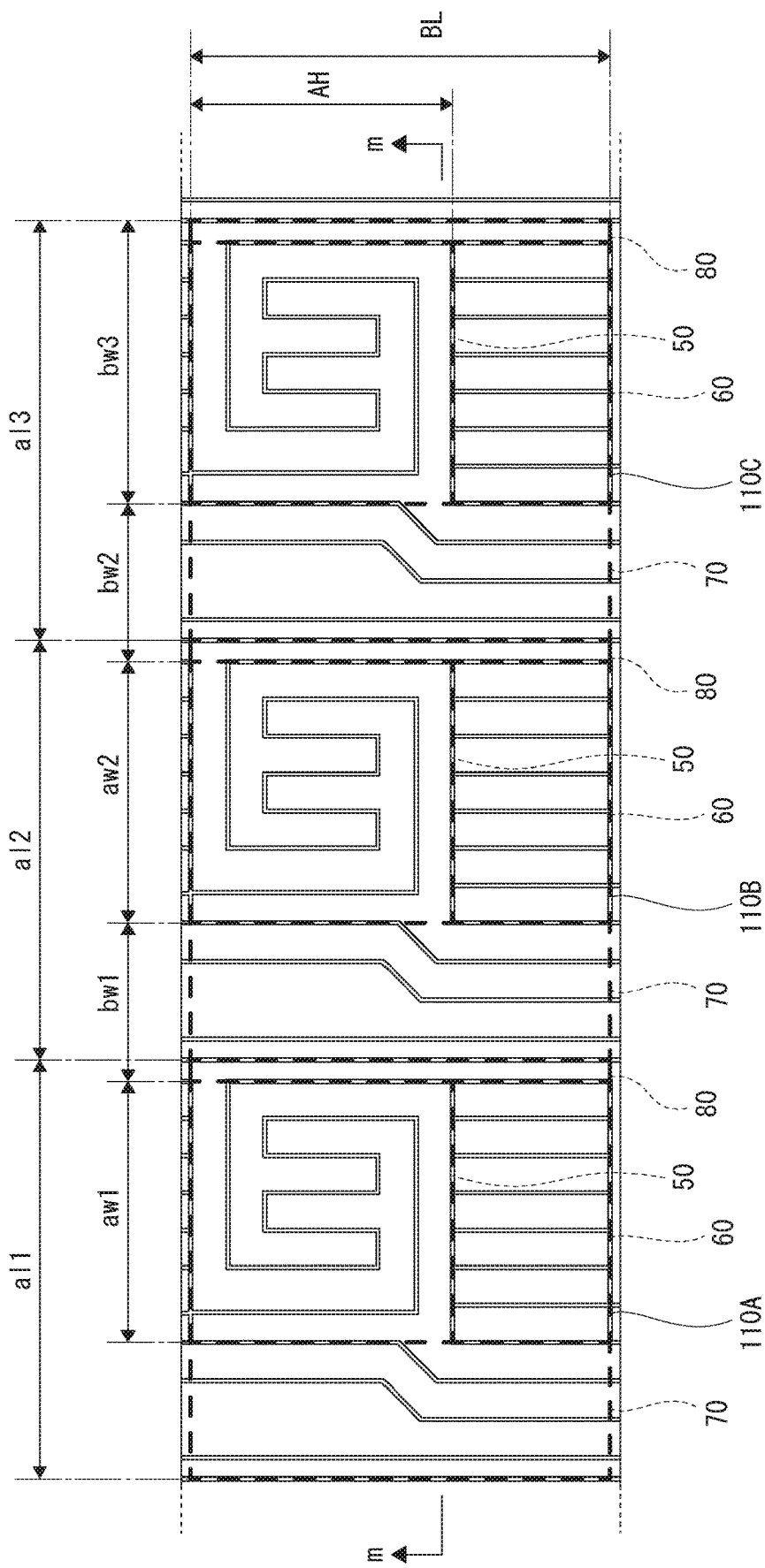
FIG. 10. is an illustration view of sensor cells arranged in a series in a left-right direction according to an embodiment.
Figure 11:
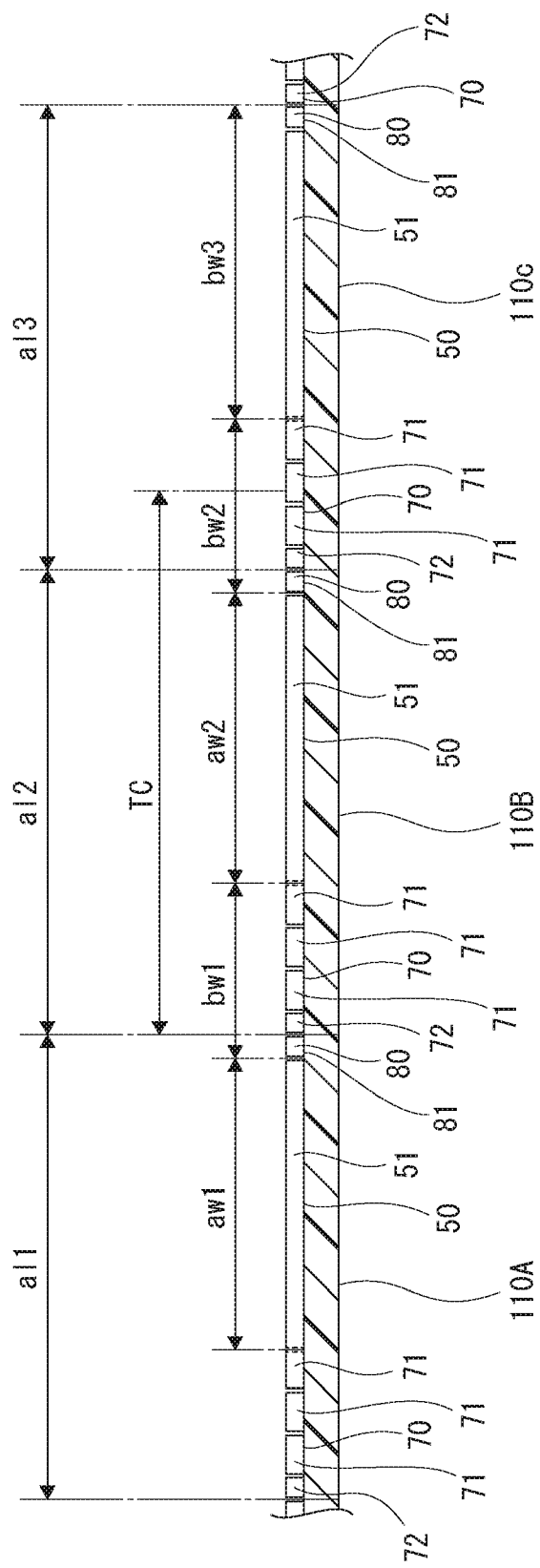
FIG. 11. is a sectional view of the embodiment of FIG. 9 along the line m-m.

On the other hand, FIGS. 9 to 11 show a sensor cell 110Y as a structure of a sensor cell 110 which does not fulfill the above formula F1. FIG. 9 shows a plan view of a structure of the sensor cell 110Y, FIG. 10 shows a part of sensor cells 110 arranged in a series in the left-right direction of a sensor pattern, and FIG. 11 shows a sectional view of FIG. 10 along a line m-m. In the following description, a lateral width al, a detection width aw and an interval width bw have different lengths from the lateral width AL, the detection width AW and the interval width BW shown in FIGS. 5 to 7, respectively.

The sensor cell 110Y as shown in FIG. 9 is formed with a lateral width al of 8 mm (al=8 mm, BL=8 mm). Further, the lateral widths al1, al2 and al3 for the sensor cells 110A, 110B and 110C according to FIG. 10 have a same length (al1=al2=al3).

According to FIGS. 10 and 11, the detection widths aw1, aw2 and aw3 of the sensor cell 110A, 110B and 110C have a same length, e.g. the detection width aw is 5 mm (aw1=aw2=aw3=5 mm). Further, interval widths bw1 and bw2 provided between the sensor cells 110A, 110B and 110C have a same length, e.g. the interval width bw is 3 mm (bw1=bw2=3 mm).

With applying the detection width aw and the interval width bw for such a sensor cell 110Y to the above formula F1, AW+2*BW−TC, this results in 5+2*3−8=3, which is larger than 1 mm. This means that the lengths of the detection width aw and the interval width bw defined for the sensor cell Y do not fulfill the formula F1.

Figure 12:
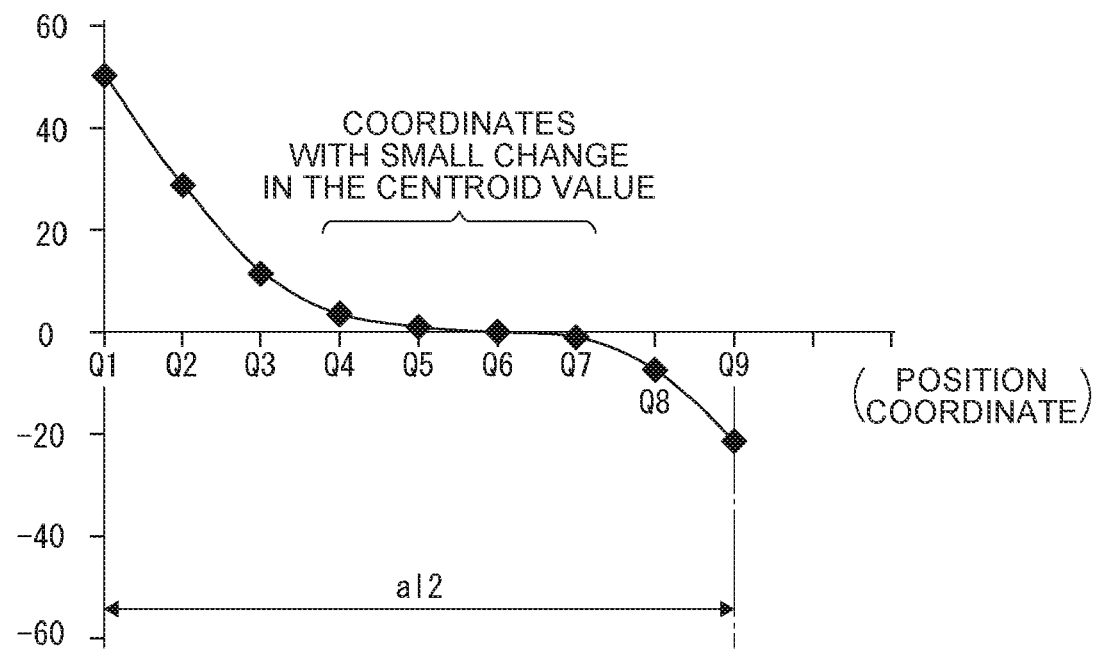
FIG. 12. is a diagram showing a relation of position coordinates to centroid values according to an embodiment.

In case that the formula F1 is not fulfilled, a graph as shown in FIG. 12 is obtained for a relation between a position coordinate Q in the left-right direction of the lateral width al for the sensor cell 110Y and a centroid value for the sensor cell 110Y. FIG. 12 shows centroid values which correspond to respective position coordinates Q1, Q2 . . . Q9 arranged in a series in the left-right direction of the lateral width al of the sensor cell 110Y. In this case, if the formula F1 is not fulfilled, unlike the graph shown in FIG. 8, there is a certain range for the coordinates in which the centroid value has a small change. According to FIG. 12, the centroid value has a small change for the coordinates Q4 to Q7. Here, the position coordinate within the sensor cell 110Y is determined by back calculation from the centroid value, so that for the coordinates Q4 to Q7 with a small change in the centroid values, it may be impossible to determine from the centroid values which of the coordinates Q4 to Q7 is the coordinate for the touch operation position. Thus, in case of using the sensor cell 110Y, the precision for detecting the touch operation position may be reduced locally when determining the coordinate position in the left-right direction within the sensor cell 110Y.

Therefore, according to the first embodiment, by defining the lengths of the detection width AW and the interval width BW as shown in the sensor cell 110X so as to fulfill the above formula F1, it is possible to avoid the reduction of the precision for detecting the touch operation position which is caused by a locally reduced change in the centroid values as shown in FIG. 12, wherein the coordinate for the touch operation position within the sensor cell 110X can be determined from a change in the centroid value with good precision.

Further, the first embodiment may employ the following configuration:
While in the above configuration the lengths of the detection width AW and the interval width BW are defined for the sensor cell 110X so as to fulfill the formula F1, the detection width AW and the interval width BW according to the first embodiment may be also defined to fulfill the following formula F2:

$$TC > AW + 2*BW \quad \text{[Formula F2]}$$

I.e., e.g. in FIG. 6, with regard to the sensor cell 110B, it is configured that a value for the touch diameter TC is larger than a summed value from the detection width AW2, the interval width BW2 and the interval width BW1. In this manner, the touch diameter TC is always overlapped with detection widths AW of two or more sensor cells 110X (e.g. the detection widths AW2 and AW1, or the detection widths AW2 and AW3). Thus, the detection width AW and the interval width BW are configured so that a conductive object such as a finger comes into contact not only with the detection region 50 of one sensor cell 110, but also with the detection region 50 of an adjacent sensor cell 110, when performing a touch operation on the touch panel 2.

With fulfilling the formula F2, it is possible to detect a change of the capacitance in the detection region 50 e.g. of the sensor cell 110A more accurately which is adjacent to the detection region 50 of the sensor cell 110B, so that a change in the centroid value for each coordinate in the sensor cell 110B can be calculated with good precision. Accordingly, the precision for detecting the coordinate of the touch operation position within the sensor cell 110B can be increased.

5. Second Embodiment

Figure 13:
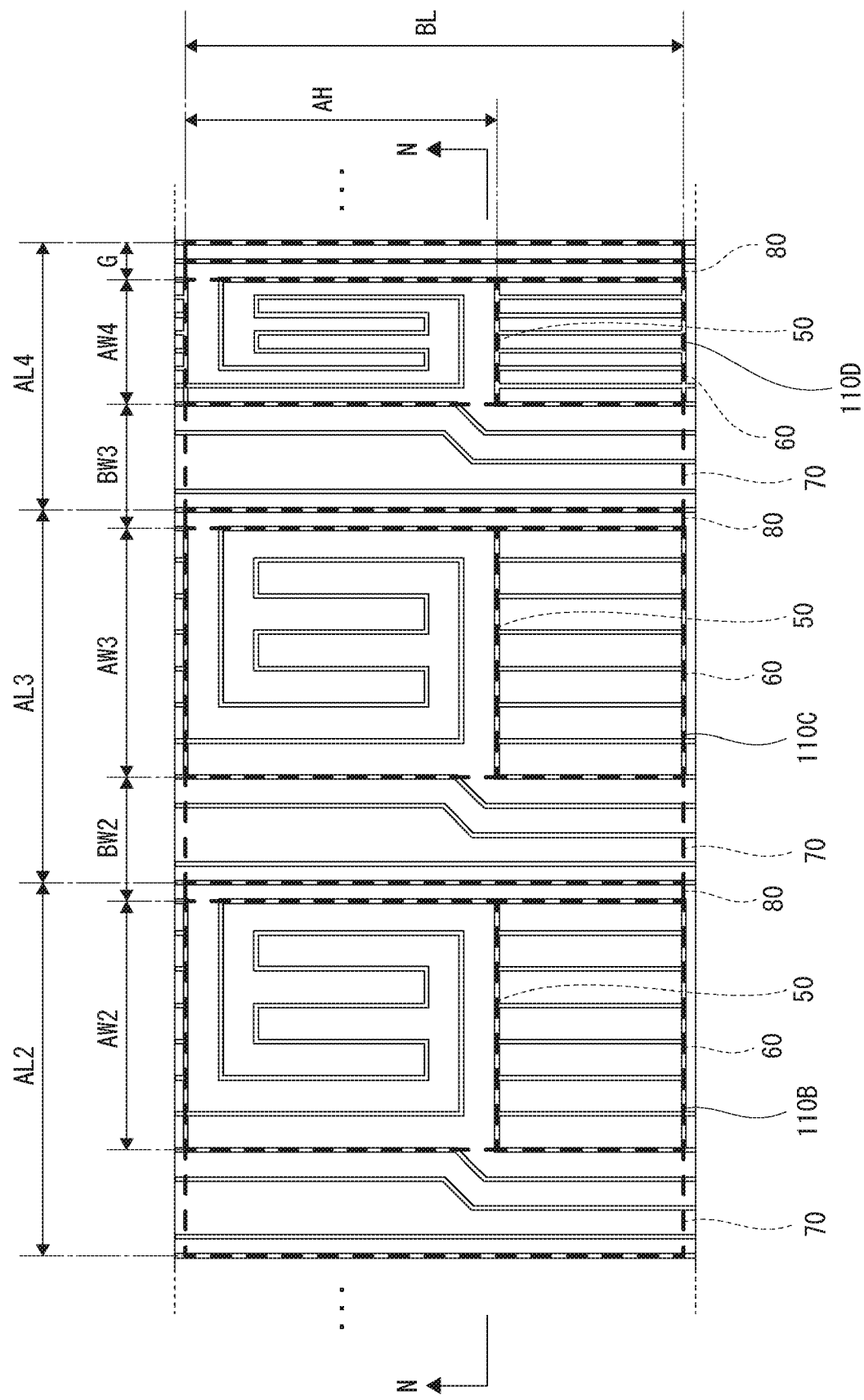
FIG. 13. is an illustration view of a sensor cell at an end according to an embodiment.
Figure 14:
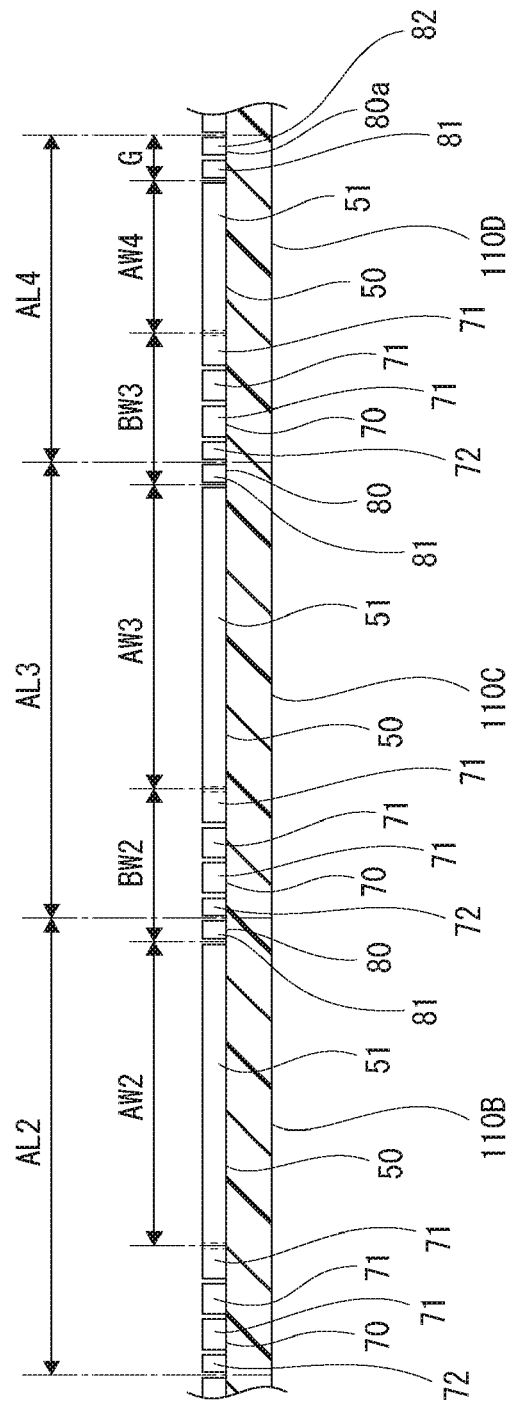
FIG. 14. is a sectional view of the embodiment of FIG. 13 along the line N-N.

A second embodiment for the structure of the touch panel 2 will be described with reference to FIGS. 13 and 14. FIG. 13 shows a part of the sensor cells 110 in the sensor pattern according to FIG. 4 which are arranged in a series from a central section to a right end, wherein FIG. 14 shows a sectional view of FIG. 13 along a line N-N.

The second embodiment will be described using a structure of a sensor cell 110D arranged at the right end of the sensor pattern as an example for a sensor cell 110 arranged at an end of the sensor pattern on the substrate 100 shown in FIG. 4.

As shown in FIG. 13, the detection region 50 occupies a smaller ratio in the sensor cell 110D at the end of the sensor pattern than in the remaining sensor cells 110B and 110C etc.

More specifically, the detection widths AW2 and AW3 have a same length in the sensor cells 110B and 110C other than the sensor cell 110D arranged at the end, however, the sensor cell 110D at the end is formed with a shorter detection width AW4 than the detection widths AW2 and AW3 (AW2=AW3>AW4). Here, the detection widths AW2 and AW3 are e.g. 4 mm (AW2=AW3=4 mm), wherein the detection width AW4 is e.g. 2 mm (AW4=2 mm).

The sensor cells 110B to 110D have a same length for a vertical width BL, e.g. 8 mm (BL=8 mm). Further, vertical heights AH of the detection regions 50 of the sensor cells 110B, 110C and 110D have a same length, e.g. the vertical heights AH are 5 mm.

An interval width BW2 for the detection regions 50 of the sensor cells 110B and the sensor cell 110C has a same length as an interval width BW3 for the detection regions 50 of the sensor cells 110C and the sensor cell 110D, e.g. 2 mm (BW2=BW3=2 mm).

Further, a receiving wiring arrangement region 80a is disposed on the right side of the detection region 50 in the sensor cell 110D, wherein as shown in FIG. 14, in addition to a receiving wiring element 81, a ground electrode 82 is arranged on the right side of the receiving wiring element 81 in the receiving wiring arrangement region 80a. The ground electrode 82 extends in the up-down direction, and is arranged adjacent to the receiving wiring element 81 in a non-contact state with the receiving wiring element 81. A width of the receiving wiring arrangement region 80a in the left-right direction is a margin width G, which is e.g. 0.6 mm (G=0.6 mm).

The sensor cell 110D at the end has fewer neighboring detection regions 50 than sensor cells 110 other than the sensor cell 110 at the end, which are e.g. in the central section. Further, since there is a region which is not affected by a change in capacitance when a touch operation is performed, such as a transmission wiring arrangement region 70 in the interval width BW3, the precision for detecting the coordinate for the touch operation position at the end of the touch panel 2 may be reduced depending on the lengths of the detection width AW4 and the interval width BW3 for the detection region 50 in the sensor cell 110D at the end. Therefore, it is necessary to define the lengths of the detection width AW4 and the interval width BW3 in order to avoid loss in the precision for detecting the coordinate of the touch operation position within the sensor cell 110D at the end.

Therefore, according to the second embodiment, the detection width AW4 of the sensor cell 110D at the end, the margin width G of the sensor cell 110D, and the interval width BW3 between the sensor cell 110D and the adjacent sensor cell 110C are defined so as to fulfill the following formula F3. In the formula F3, the detection width AW4 is indicated simply with AW, and the interval width BW3 is indicated with BW, for the sake of convenience. Further, each value is stated in mm, "TC/2" represents dividing the value for the touch diameter TC in half.

$$2 > AW + (BW + G) - TC/2 \qquad \text{[Formula F2]}$$

In the above formula F3, 2 mm is a target value for the coordinate position precision for the sensor cell 110D at the end, wherein it may be various values depending on the target for the coordinate position precision for the sensor cell 110 at the end, e.g. 1, 0, −1, as long as it is below 2 mm. Defining the detection width AW and the interval width BW according to the formula F3 means that the detection width AW4 and the interval width BW3 for the sensor cell 110D at the end are defined.

According to the present embodiment, when the touch diameter TC is set to 8 mm (TC=8 mm), the detection width AW4=2 mm, the interval width BW3=2 mm and the margin width G=0.6 mm are obtained so that applying these values to the formula F3 results in 2>2+(2+0.6)−8/2=0.6, which fulfills the formula F3.

Figure 15:
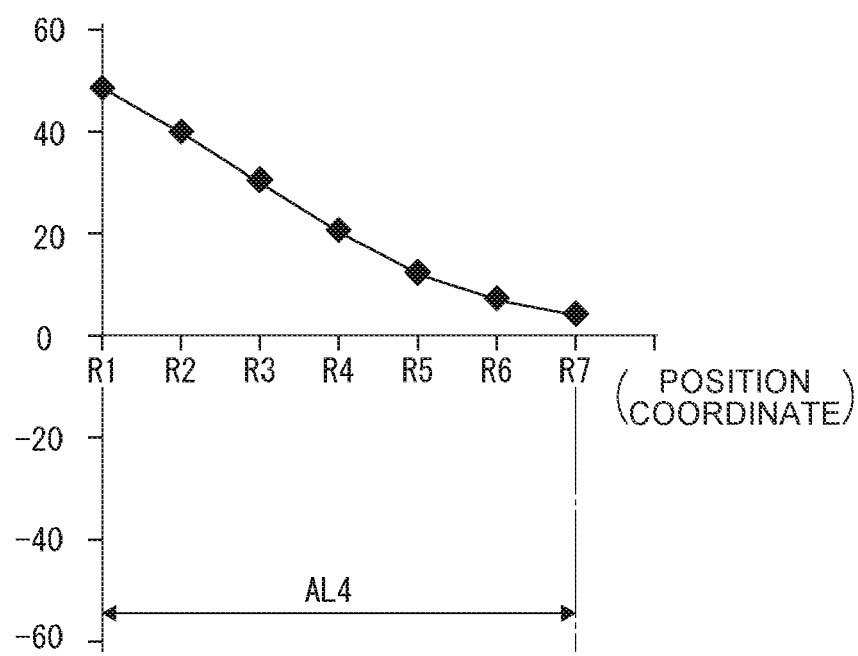
FIG. 15. is a diagram showing a relation of position coordinates to centroid values according to an embodiment.

By defining the detection width AW4 and the interval width BW3 so as to fulfill the formula F3, a change in capacitance in the detection region 50 e.g. of the adjacent sensor cell 110C can have influence when a touch operation is detected in the sensor cell 110D at the end. In this manner, a graph as shown in FIG. 15 can be obtained for a relation between a position coordinate R in the left-right direction of a lateral width AL4 of the sensor cell 110D and a centroid value for the sensor cell 110D at the end. I.e., as shown in FIG. 15, this results in that different centroid values are associated with position coordinates R1, R2 . . . R7 which are located in a series in the left-right direction of the lateral width AL4 of the sensor cell 110D.

Since the position coordinate within the sensor cell 110D can be detected by back calculation from the centroid value, coordinates along the lateral width AL4 which correspond to the respective centroid values as shown in FIG. 15 can be determined in a unique manner. Thus, it is possible to calculate the position coordinate R corresponding to a change in the centroid value for the sensor cell 110D at the end with a good precision, wherein the sensor cell 110D would tend to have a small area for the detection region 50, and it is also possible to maintain or increase the precision for detecting the touch operation position within the sensor cell 110D.

Figure 16:
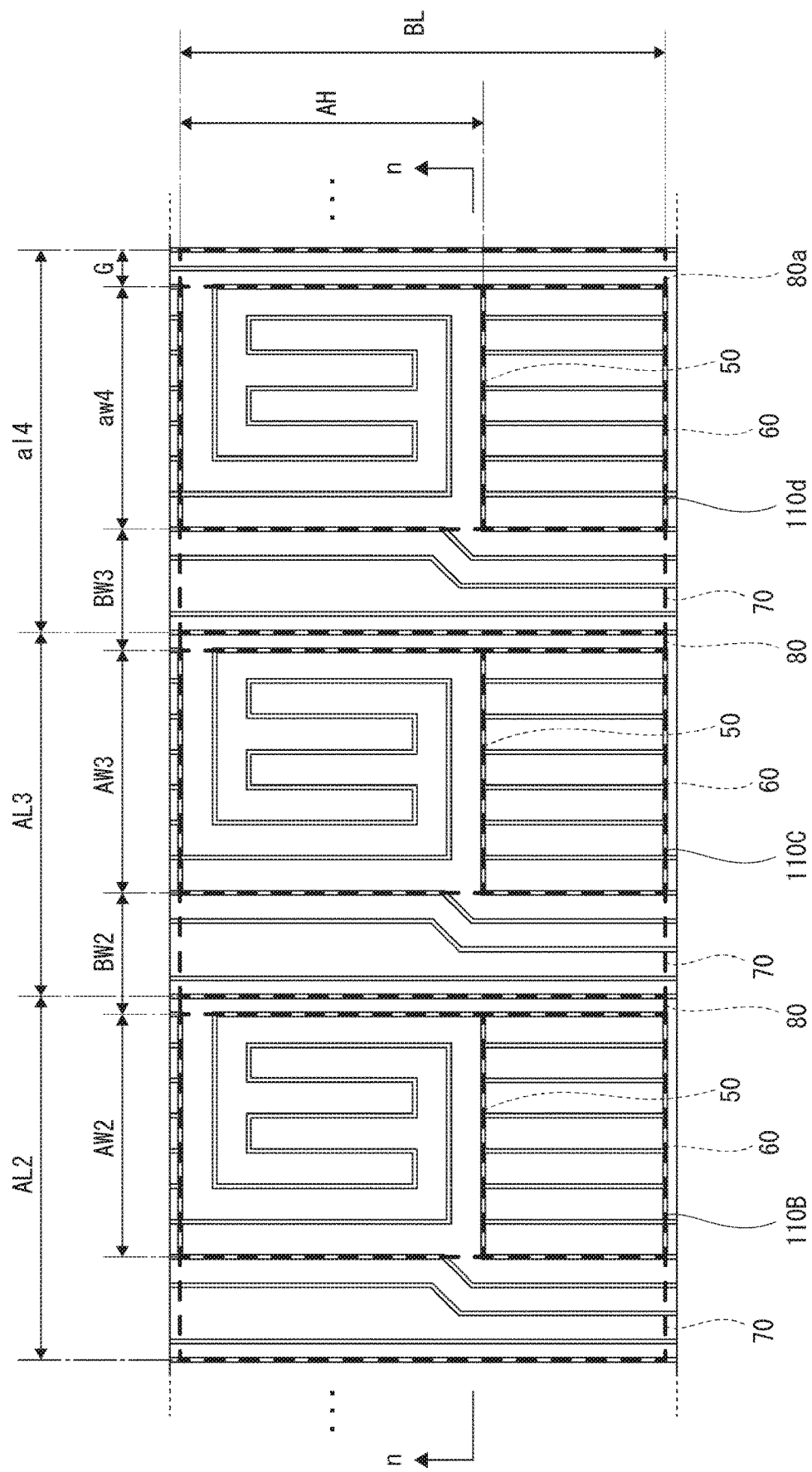
FIG. 16. is an illustration view of a sensor cell at an end according to an embodiment.
Figure 17:
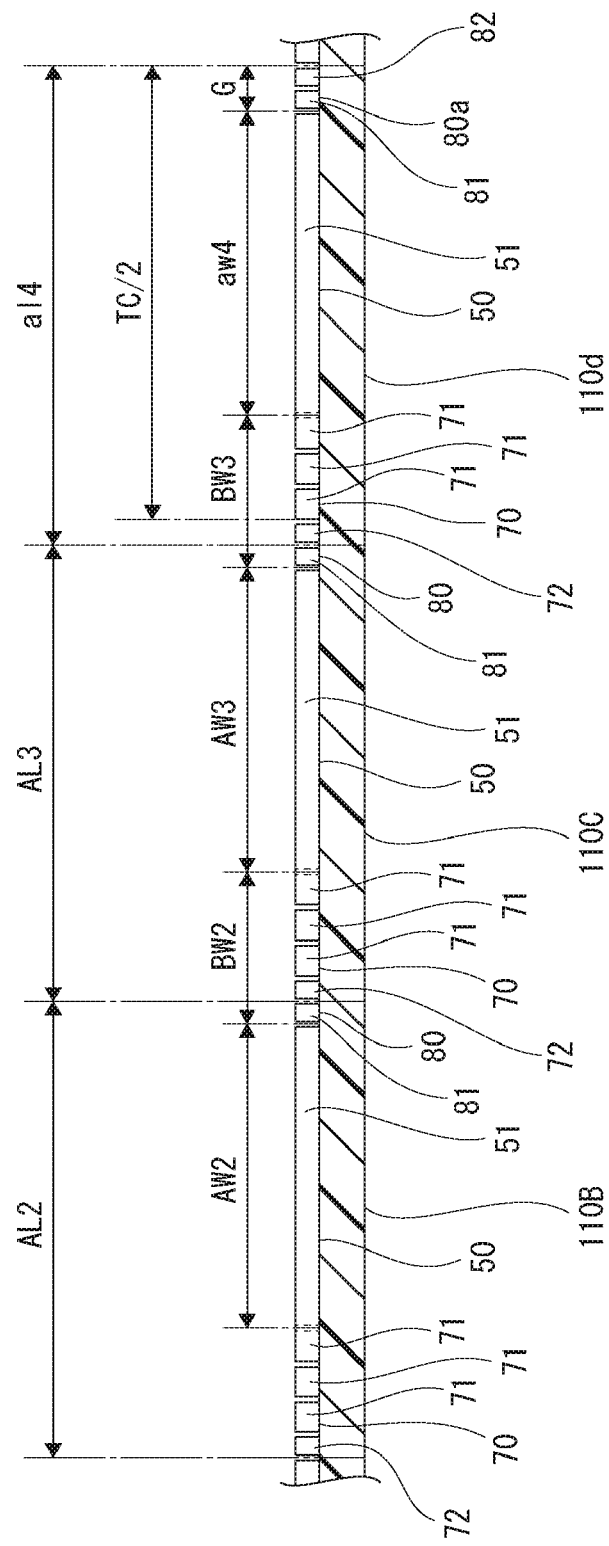
FIG. 17. is a sectional view of the embodiment of FIG. 16 along the line n-n.

On the other hand, FIGS. 16 and 17 show a sensor cell 110d at an end as a case where the above formula F3 is not fulfilled. FIG. 16 shows a part of sensor cells 110 which are arranged in a series from a central section to a right end in the sensor pattern shown in FIG. 4, and FIG. 17 shows a sectional view of FIG. 16 along a line n-n. In the following description, a lateral width al and a detection width aw have different lengths from the lateral width AL and the detection width AW shown in FIGS. 13 and 14, respectively.

According to FIGS. 16 and 17, the detection widths AW2, AW3 and aw4 of the sensor cell 110B, 110C and 110d have a same length, e.g. of 4 mm (AW2=AW3=aw4=4 mm). Further, interval widths BW2 and BW3 provided between the sensor cells 110B, 110C and 110d have a same length, e.g. of 2 mm (BW2=BW3=2 mm).

With applying the detection width aw4 and the interval width BW3 for such a sensor cell 110d at the end to the above formula F3 2>AW+(BW+G)−TC/2, 4+(2+0.6)−8/2=2.6 is obtained, and thus not smaller than 2 mm. This means that the formula F3 are not fulfilled with the lengths of the detection width aw4 and the interval width BW3 for the sensor cell 110d at the end.

Figure 18:
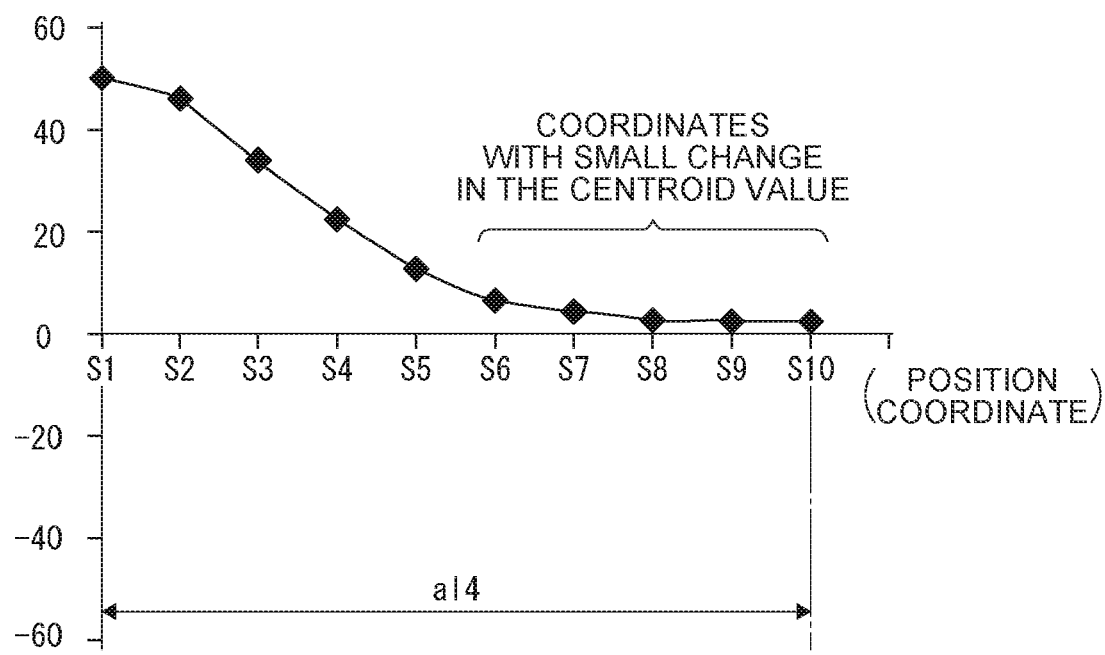
FIG. 18. is a diagram showing a relation of position coordinates to centroid values according to an embodiment.

In case that the formula F3 is not fulfilled, a graph as shown in FIG. 18 is obtained for a relation between a position coordinate S in the left-right direction of a lateral width al4 for the sensor cell 110d at the end and a centroid value for the sensor cell 110d. FIG. 18 shows centroid values which correspond to respective position coordinates S1, S2 . . . S10 arranged in a series in the left-right direction of the lateral width al4 for the sensor cell 110d. In this case, if the formula F3 is not fulfilled, unlike the graph shown in FIG. 15, there is a certain range for the coordinates with a small change in the centroid value. According to FIG. 18, the centroid value has a small change for the coordinates S6 to S10. The position coordinate within the sensor cell 110d is determined by back calculation from the centroid value, so that for the coordinates S6 to S10 with a small change in the centroid values, it may be impossible to determine from the centroid values which of the coordinates S6 to S10 is the touch operation position. Thus, in case of using the sensor cell 110d at the end, it is to be expected that the precision for detecting the touch operation position may be reduced locally when determining the coordinate position in the left-right direction within the sensor cell 110d.

Therefore, according to the second embodiment, by defining the lengths of the detection width AW4 and the interval width BW3 for the sensor cell 110D at the end so as to fulfill the above formula F3, the reduction of the precision for detecting the touch operation position can be avoided which is caused by a locally reduced change in the centroid values as shown in FIG. 18, wherein it can be ensured that the touch operation position can be detected from a change in the centroid value with same or better precision within the sensor cell 110D at the end than in sensor cells 110 other than that at the end, e.g. in the central section.

Further, the second embodiment may employ the following configuration:

While in the above configuration the lengths of the detection width AW4 and the interval width BW3 are defined for the sensor cell 110D at the end so as to fulfill the formula F3, the detection width AW4 and the interval width BW3 may be also defined to fulfill the following formula F4:

$$2 > AW + BW - TC/2 \qquad \text{[Formula 4]}$$

As seen from the above, the formula F4 represents cases of the formula F3 without addition of the margin width G. By defining the detection width AW and the interval width BW so as to fulfill the formula F4, the coordinates along the lateral width AL4 which correspond to the respective centroid values as shown in FIG. 15 can be determined in a unique manner. Here, e.g. when the touch diameter TC is set to 8 mm (TC=8 mm), the detection width AW4 is 2 mm and the interval width BW3 is 2 mm for the sensor cell 110D as shown in FIG. 13 (AW=2 mm, BW=2 mm), so that applying these values to the formula F4 results in 2>2+2−8/2=0, which fulfills the formula F4. In this manner, it can be ensured that the touch operation position can be detected from a change in the centroid value with same or better precision within the sensor cell 110D at the end than in sensor cells 110 other than that at the end, e.g. in the central section, so that the precision for detecting the coordinate for the touch operation position at ends of the touch panel 2 can be increased. Although the present embodiment has been described with reference to the case with the sensor cells 110 which are arranged as shown in FIG. 13 in a series from the central section to the right end within the sensor pattern according to FIG. 4, the above described idea can be applied similarly to sensor cells 110 which are arranged in a series from the central section to a left end within the sensor pattern. In this case, the detection regions 50 occupy a smaller ratio in the respective sensor cells 110 at both of the left and right ends of the sensor pattern than in sensor cells 110 other than those at both of the left and right ends etc.

6. Third Embodiment

A third embodiment for the structure of the touch panel 2 will be described with reference to FIGS. 19 and 20. The third embodiment represents a case where sensor cells 110 are arranged in a series and formed so that areas of detection regions 50 in the sensor cells 110 are decreased at a constant rate gradually.

Figure 19:
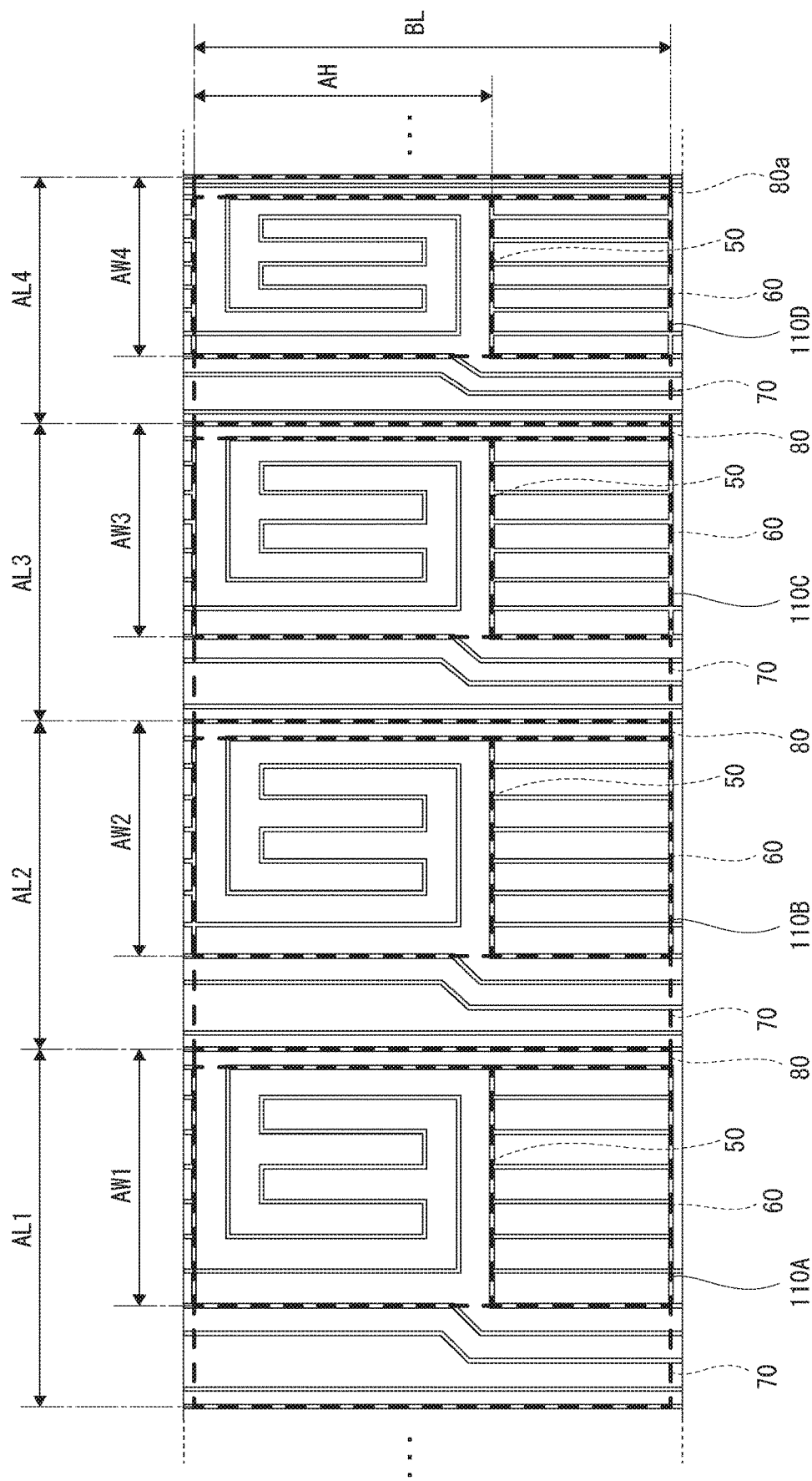
FIG. 19. is an illustration view of sensor cells arranged in a series in a left-right direction according to an embodiment.

According to FIG. 19, a lateral width AL1 of a sensor cell 110A, a lateral width AL2 of a sensor cell 110B, a lateral width AL3 of a sensor cell 110C, and a lateral width AL4 of a sensor cell 110D gradually become shorter in this sequence at a predetermined rate (AL1>AL2>AL3>AL4). For example, it is provided so that the lateral width becomes shorter by 0.7 mm for each of the sensor cells 110 so that the lateral width AL1 is 6.1 mm, the lateral width AL2 5.4 mm, the lateral width AL3 4.7 mm, and the lateral width AL4 4 mm (AL1=6.1 mm, AL2=5.4 mm, AL3=4.7 mm, AL4=4 mm).

Here, since the sensor cells 110 arranged in a series from a central section to an end have a constant vertical width BL, the areas of the sensor cells 110A, 110B, 110C and 110D gradually become smaller at a constant rate by the lengths of the lateral widths AL becoming shorter at the constant rate toward the end gradually.

In addition, the sensor cells 110 are provided so that their detection widths AW1, AW2, AW3 and AW4 gradually become shorter in this sequence at a predetermined rate as the lengths of the lateral widths AL for the sensor cells 110 become shorter gradually (AW1>AW2>AW3>AW4). For example, it is provided so that the detection width AW1 is 4.1 mm, the detection width AW2 3.4 mm, the detection width AW3 2.7 mm, and the detection width AW4 2 mm (AW1=4.1 mm, AW2=3.4 mm, AW3=2.7 mm, AW4=2 mm). In this case, since the sensor cells 110 have a constant vertical width AH, the areas of the detection regions 50 in the sensor cells 110 become smaller gradually from the central section toward the end similarly.

Figure 20:
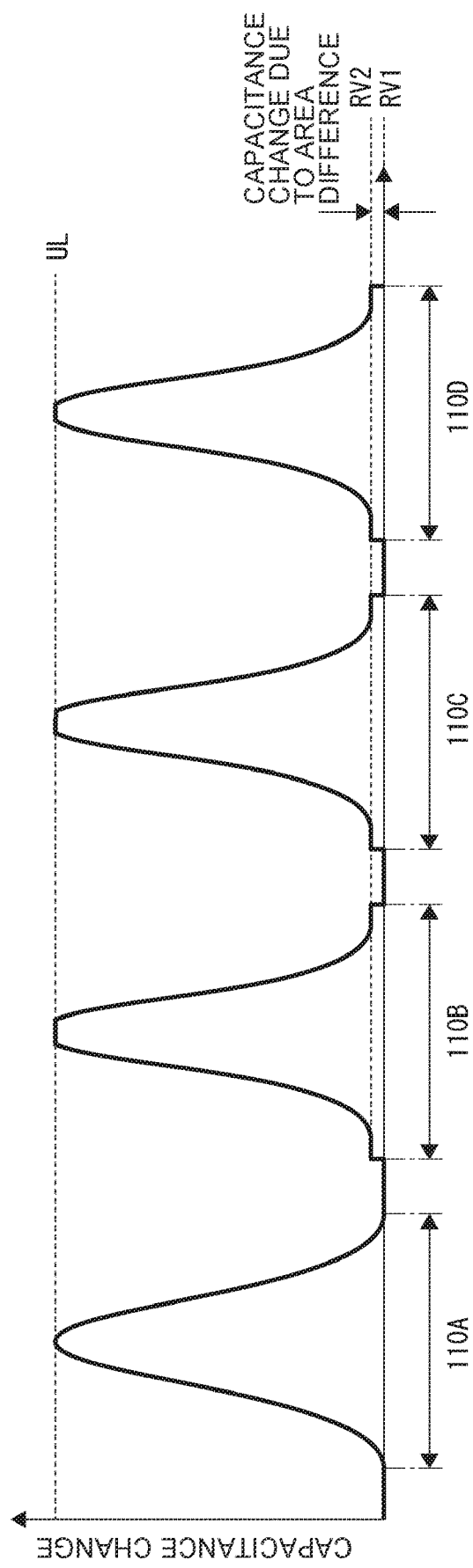
FIG. 20. shows a capacitance change for each of sensor cells according to an embodiment.

FIG. 20 shows an amount of a capacitance change in each of sensor cells 110A, 110B, 110C and 110D arranged in a series from the central section toward the end. When no touch operation is performed in the detection region 50 in the sensor cell 110A in the central section, a reference value RV for a capacitance change in the detection region 50 exhibits a reference value RV1. In this case, when a touch operation is performed in the detection region 50, a capacitance change from the reference value RV1 is detected. At this time, the capacitance changes within a range which does not exceed an upper limit value UL at which the change is to be detected, so that a coordinate for the touch operation position within the sensor cell 110A which corresponds to the capacitance change can be determined accurately.

On the other hand, when the capacitance change is detected, the sensor cells 110B, 110C and 110D which are closer to the end are affected depending on areas of the detection regions 50 in adjacent sensor cells 110, even in a state with no touch operation. For example, a value for a capacitance change in the detection region 50 of the sensor cell 110B is affected by an area of the detection region 50 in the adjacent sensor cell 110A. Similarly, a value for a capacitance change in the detection region 50 of the sensor cell 110C is affected by an area of the detection region 50 in the adjacent sensor cell 110B, and a value for a capacitance change in the detection region 50 of the sensor cell 110D is affected by an area of the detection region 50 of the adjacent sensor cell 110C.

Accordingly, even in a state of the detection region 50 in the sensor cell 110B in which no touch operation is performed, the reference value RV for the capacitance change becomes a reference value RV2 which is higher than the reference value RV1. In such a state with no touch operation, the larger an area difference is between the detection region 50 of the sensor cell 110 to be detected and an adjacent sensor cell 110, the larger a change of the reference value RV is.

Figure 21:
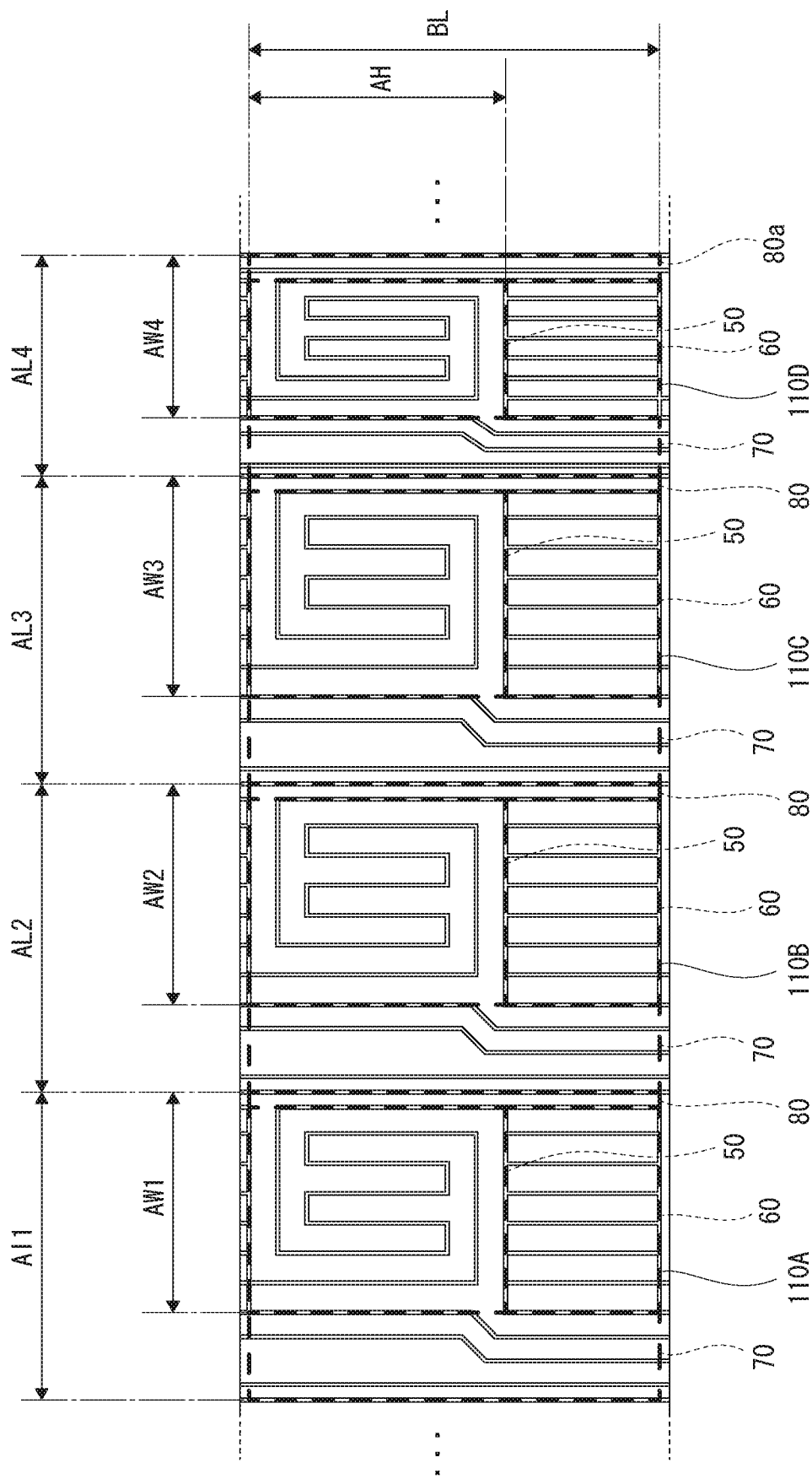
FIG. 21. is an illustration view of sensor cells arranged in a series in a left-right direction according to an embodiment.

For example, as shown in FIG. 21, detection widths AW1, AW2 and AW3 of detection regions 50 in sensor cells 110A, 110B and 110C other than that at an end have a same length, e.g. of 4 mm (Aw1=AW2=AW3=4 mm), while a detection width AW4 of a detection region 50 in a sensor cell 110D at the end has a shorter length than the detection widths AW1, AW2 and AW3, e.g. a length of 2 mm (Aw1=AW2=AW3>AW4=2 mm). I.e., the detection regions 50 in the sensor cells 110A, 110B and 110C other than that at the end have a same area, wherein the detection region 50 in the sensor cell 110D at the end has a smaller area than the sensor cells 110 other than the sensor cell 110D.

Figure 22:
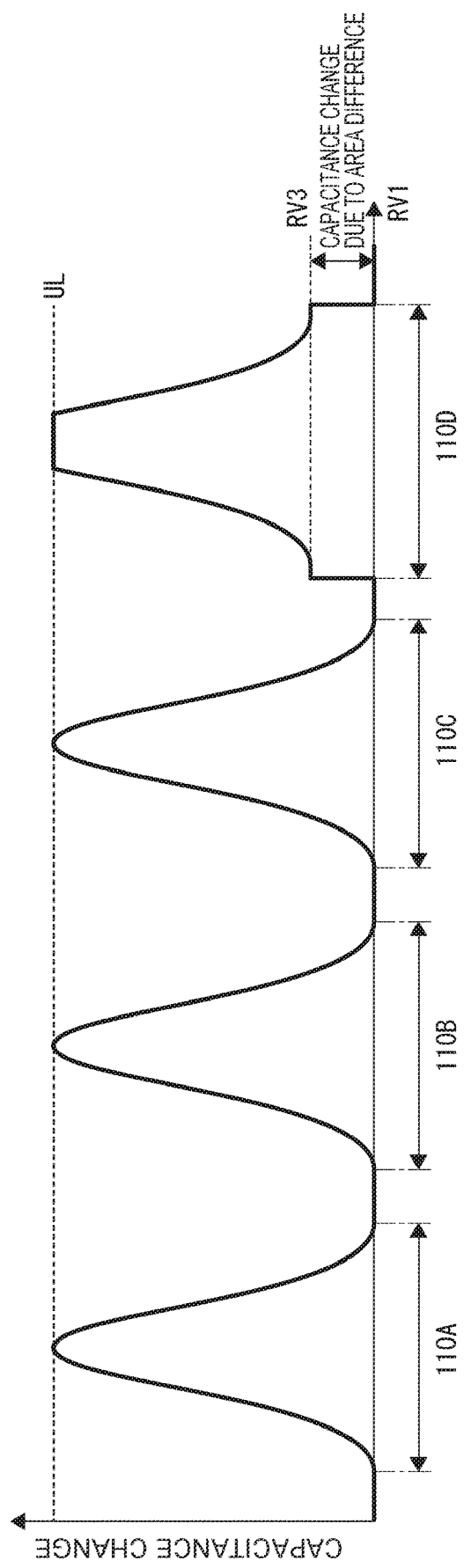
FIG. 22. shows a capacitance change for each of sensor cells according to an embodiment.
Figure 23:
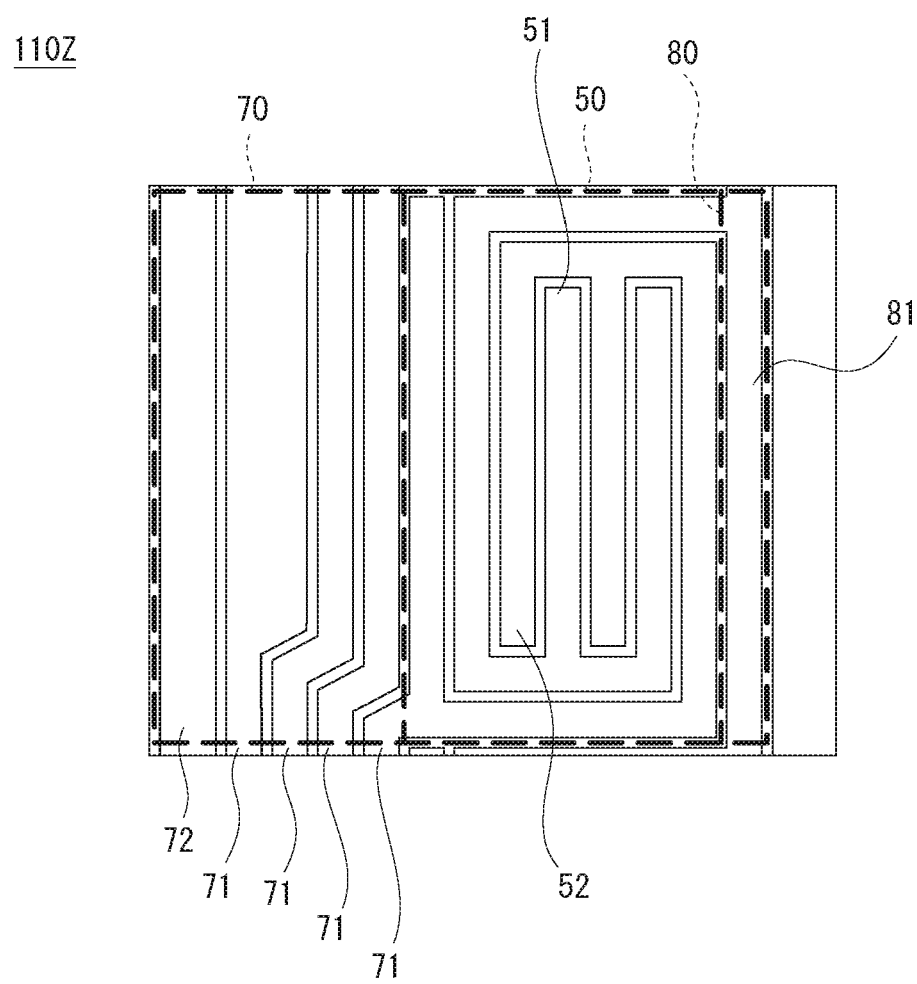
FIG. 23. is an illustration view of an exemplar variation of a sensor cell structure according to an embodiment.

In this case, due to the same areas of the sensor cells 110 other than that at the end, there is a larger area difference between the areas of the detection regions 50 in the sensor cell 110C and the sensor cell 110D at the end than in the case according to FIG. 19. Then, as shown in FIG. 22, the reference value RV for the sensor cell 110D exhibits a larger reference value RV3 in case of no touch operation in the detection region 50 than the reference value RV2 shown in FIG. 19.

When in such a case a touch operation is performed in the detection region 50 of the sensor cell 110D, there is a larger section in which a value for the capacitance change exceeds the upper limit value UL for detection, wherein no accurate value for the capacitance change can be detected for the section in which the upper limit value UL is exceeded, so that it may be impossible to calculate a coordinate for the touch operation position within the sensor cell 110D accurately which corresponds to the capacitance change.

Therefore, according to the third embodiment, areas of the detection regions 50 in the sensor cells 110 gradually become smaller from the central section to the end, as shown in FIG. 19. In this manner, adjacent sensor cells 110 can have a smaller area difference, so that as shown in FIG. 20 the reference value RV for the capacitance change due to an area difference between the adjacent sensor cells 110 can be the reference value RV2 which is lower than the reference value RV3.

Since this results in an extremely smaller section in which the upper limit value UL at which the capacitance change can be detected is exceeded when a touch operation is performed in any of the detection regions 50 of the sensor cells 110B, 110C and 110D, the coordinate for the touch operation position within the sensor cells 110B, 110C and 110D corresponding to the capacitance change can be calculated while avoiding a loss in the precision.

Therefore, according to the third embodiment, the areas of the sensor cells 110 gradually become smaller which are arranged from the central section toward an end in the sensor pattern, so that it is prevented that the reference value RV for the capacitance change is excessively increased due to the area difference between adjacent sensor cells 110, whereby the precision for detecting the touch operation position in each of the sensor cells 110 can be maintained or increased. Although in the present embodiment, the case has been described where the areas of the detection regions 50 in the sensor cells 110 gradually become smaller from the central section toward the right end, as shown in FIG. 19, the above idea can be applied similarly to cases where areas of detection regions 50 of sensor cells 110 gradually become smaller from the central section toward a left end.

7. Conclusion and Exemplar Variations

A touch panel 2 (touch panel device) according to some of the above embodiments includes a plurality of detection regions 50 arranged in a matrix form (see FIG. 4); and a transmission wiring element 71 and a receiving wiring element 81 formed for each of the plurality of detection regions 50, wherein a transmission wiring arrangement region 70 with the transmission wiring element 71 arranged therein, the plurality of detection regions 50, and a receiving wiring arrangement region 80 with the receiving wiring element 81 arranged therein are formed being aligned in one direction, wherein a value calculated from a formula as follows is smaller than a target value for a coordinate position precision:

$$AW+2*BW-TC,$$

wherein BW is an interval width from one of the detection regions 50 to a next of the detection regions 50 via the receiving wiring arrangement region 80 and the transmission wiring arrangement region 70 in a left-right direction, AW is a detection width for the detection regions 50 in the left-right direction, and TC is a touch diameter (see formula F1, FIGS. 6 to 8).

In this manner, the detection width AW for a detection region 50 as well as the interval width BW from the detection region 50 to a next detection region in the left-right direction are determined in order to allow the detection regions 50 in the sensor cells 110 to be more easily affected by a detection region 50 of a sensor cell 110 in a periphery for detection of a touch operation position. By defining the lengths of the detection width AW and the interval width BW for the sensor cell 110X so as to fulfill the above formula F1, the reduction of the precision for detecting the touch operation position can be avoided which is caused by a locally reduced change in the centroid values as shown in FIG. 12, wherein the touch operation position within the sensor cell 110X can be calculated with good precision from a change in the centroid value.

Thus, it is possible to maintain or increase the precision for detecting the touch operation position in each of the sensor cells 110 for the touch panel 2.

For the touch panel 2, TC>AW+2*BW (formula F2) is fulfilled.

In this manner, the detection width AW for the detection region 50 and the interval width BW from the detection region 50 to a next detection region 50 in the left-right direction are configured so that the touch diameter TC extends across two or more detection regions 50.

With fulfilling the formula F2, it is possible to detect a change of the capacitance in the detection region 50 e.g. of the sensor cell 110A more accurately which is adjacent to the detection region 50 of the sensor cell 110B, so that the centroid value for use in calculation of the coordinate is more distinct and the coordinate for the touch operation position within the sensor cell 110B can be detected with an increased precision.

For the touch panel 2, AW>BW is fulfilled.

The detection region 50 has a larger size with the detection width AW being larger than the interval width BW for the sensor cell 110, so that detection regions of the sensor cells 110 in the sensor cell group may be allowed to be more easily affected by a detection region 50 of a sensor cell 110 in the periphery when detection of a touch operation position is performed.

Thus, it is possible to further increase the precision for detecting the coordinate of the touch operation position in each of the sensor cells 110.

Further, a touch panel 2 (touch panel device) according to some embodiments includes: a plurality of detection regions 50 arranged in a matrix form; and a transmission wiring element 71 and a receiving wiring element 81 formed for each of the plurality of detection regions 50, wherein a transmission wiring arrangement region 70 with the transmission wiring element 71 arranged therein, the plurality of detection regions 50, and a receiving wiring arrangement region 80 with the receiving wiring element 81 arranged therein are formed being aligned in a left-right direction, wherein a value calculated from a formula as follows is smaller than a target value for a coordinate position precision:

$$AW+BW-TC/2,$$

wherein BW is an interval width from one of the detection regions 50 at an end in the left-right direction to an adjacent one of the detection regions 50 via the receiving wiring arrangement region 80 and the transmission wiring arrangement region 70, AW is a detection width for the one of the detection regions 50 at the end in the left-right direction, and TC is a touch diameter (see formula F4 and FIGS. 13 to 15).

In this manner, the detection width AW for the detection region 50 in one of the sensor cells 110 at the end as well as the interval width BW from the detection region 50 at the end to the adjacent detection region 50 are determined in order to allow the detection region 50 at the end to be more easily affected by a detection region 50 of a sensor cell 110 in the periphery when detection of a touch operation position is performed.

By defining the detection width AW4 and the interval width BW3 for the sensor cell 110 at the end so as to fulfill the formula F4, it is possible to avoid the reduction of the precision for detecting the touch operation position which is caused by a locally reduced change in the centroid values as shown in FIG. 18, wherein it can be ensured that for the touch operation position can be detected from a change in the centroid value with same or better precision within the sensor cell 110D at the end than in sensor cells 110 other than that at the end, e.g. in the central section.

For the touch panel 2, the detection width AW4 for the one of the detection regions 50 at the end is narrower than the detection width AW3 of the adjacent one of the detection regions 50 (see FIG. 13).

This may enable that detection regions of sensor cells of the sensor cell 110 group which are arranged at the end can be more easily affected by a detection region of a sensor cell 110 in the periphery when detection of a touch operation position at the end of the touch panel is performed. Thus, it is possible to further increase the precision for detecting the coordinate of the touch operation position in each of the sensor cells 110.

Furthermore, a touch panel 2 (touch panel device) according to some embodiments includes: a plurality of detection regions 50 arranged in a matrix form; and a transmission wiring element 71 and a receiving wiring element 81 formed for each of the plurality of detection regions 50, wherein a transmission wiring arrangement region 70 with the transmission wiring element 71 arranged therein, the plurality of detection regions 50, and a receiving wiring arrangement region 80 with the receiving wiring element 81 therein are formed being aligned in a left-right direction, wherein at least some of the plurality of detection regions 50 are arranged in a series from a central section to an end of the touch panel 2 in the left-right direction and configured so that areas of the at least some of the plurality of detection regions 50 are decreased at a substantially constant rate along the left-right direction (see FIGS. 19 and 20).

In this manner, a capacitance change due to an area difference between adjacent detection regions may be reduced. Therefore, with the sensor cells 110 which are arranged from the central section toward an end in the sensor pattern and have an area gradually becoming smaller, an excessive increase of the reference value RV for the capacitance change can be prevented which is cause due to the area difference between adjacent sensor cells 110, whereby the precision for detecting the touch operation position in each of the sensor cells 110 can be maintained or increased.

Furthermore, a structure of the touch panel 2 according to the present embodiment may be implemented in the following manners:

The sensor cell 110 according to the present embodiment may have a structure other than that of the sensor cell 110X. For example, as shown e.g. in the sensor cell 110Z according to FIG. 23, the detection region 50 may be arranged with extension in an up-down direction without a dummy electrode arrangement region 60. In this manner, adjacent regions of the transmission electrode 51 and the receiving electrode 52 are increased so that a change in a capacitance for the detection region 50 can be increased. Therefore, using the structure of the sensor cell 110Z may increase a sensitivity of the touch panel 2.

This is advantageous particularly when there is a large separation between the detection region 50 and an operator performing a touch operation, for instance in case of a thick cover glass for the touch panel 2 and/or touch operation with a finger covered by e.g. a glove.

As a conclusion, the description of the above embodiments is merely intended as examples of the present invention, and the present invention should not be limited to the above embodiments. Therefore, it should be understood that various modifications other than the above embodiments may be implemented depending on the design etc. within a scope which does not depart from the technical idea according to the present invention. Furthermore, the effects disclosed herein are not limiting but intended for illustration only, and other effects are possible.

REFERENCE SIGNS LIST

2 Touch panel
21 Transmission signal line
22 Receiving signal line
50 Detection region
51 Transmission electrode
52 Receiving electrode
70 Transmission wiring arrangement region
71 Transmission wiring element
80 Receiving wiring arrangement region
81 Receiving wiring element
110 Sensor cell
AW Detection width
BW Interval width
TC Touch diameter

What is claimed is:

1. A touch panel device comprising:
a plurality of detection regions arranged in a matrix form; and
a transmission wiring element and a receiving wiring element formed for each of the plurality of detection regions,
wherein a transmission wiring arrangement region with the transmission wiring element arranged therein, the plurality of detection regions, and a receiving wiring arrangement region with the receiving wiring element arranged therein are formed being aligned in one direction,
wherein a value calculated from a formula as follows is smaller than a target value for a coordinate position precision:

$$AW+BW-TC/2,$$

wherein BW is an interval width from an end of one of the detection regions to a beginning of a next one of the detection regions via the receiving wiring arrangement region and the transmission wiring arrangement region in the one direction, AW is a width for the detection regions in the one direction, and TC is a touch diameter of a conductive object.

2. The touch panel device according to claim 1, wherein AW>BW is fulfilled.

3. The touch panel device according to claim 1, wherein TC>AW+2*BW is fulfilled.

4. The touch panel device according to claim 3, wherein AW>BW is fulfilled.

5. A touch panel device comprising:
a plurality of detection regions arranged in a matrix form; and
a transmission wiring element and a receiving wiring element formed for each of the plurality of detection regions,
wherein a transmission wiring arrangement region with the transmission wiring element arranged therein, the plurality of detection regions, and a receiving wiring arrangement region with the receiving wiring element arranged therein are formed being aligned in one direction,
wherein a value calculated from a formula as follows is smaller than a target value for a coordinate position precision:

$$AW+BW-TC/2,$$

wherein BW is an interval width from an end of one of the detection regions at an end in the one direction to a beginning; of an adjacent one of the detection regions via the receiving wiring arrangement region and the transmission wiring arrangement region, AW is a width for the one of the detection regions at the end in the one direction, and TC is a touch diameter of a conductive object.

6. The touch panel device according to claim 5, wherein the width for the one of the detection regions at the end in the one direction is narrower than the width of the adjacent one of the detection regions in the one direction.

* * * * *